US012674042B2

(12) United States Patent
Di Ronza et al.

(10) Patent No.: US 12,674,042 B2
(45) Date of Patent: Jul. 7, 2026

(54) RUBBER COMPOUNDS FOR USE IN PRODUCING VEHICLE TIRES

(71) Applicant: Bridgestone Europe NV/SA, Zaventem (BE)

(72) Inventors: Rafaelle Di Ronza, Rome (IT); Yoshihiro Morishita, Tokyo (JP); Anke Blume, Enschede (NL); Rafal Anyszka, Enschede (NL); Maria del Pilar Bernal-Ortega, Enschede (NL)

(73) Assignee: Bridgestone Europe NV/SA, Zaventem (BE)

(*) Notice: Subject to any disclaimer, the term of this patent is extended or adjusted under 35 U.S.C. 154(b) by 536 days.

(21) Appl. No.: 18/038,186

(22) PCT Filed: Nov. 22, 2021

(86) PCT No.: PCT/EP2021/082546
§ 371 (c)(1),
(2) Date: May 22, 2023

(87) PCT Pub. No.: WO2022/106700
PCT Pub. Date: May 27, 2022

(65) Prior Publication Data

US 2024/0002640 A1 Jan. 4, 2024

(30) Foreign Application Priority Data

Nov. 23, 2020 (EP) .................................... 20209170

(51) Int. Cl.
*C08K 9/08* (2006.01)
*B60C 1/00* (2006.01)
*C08K 3/36* (2006.01)
*C08K 9/06* (2006.01)

(52) U.S. Cl.
CPC .............. *C08K 9/08* (2013.01); *B60C 1/0016* (2013.01); *C08K 3/36* (2013.01); *C08K 9/06* (2013.01)

(58) Field of Classification Search
CPC .... C08K 9/08; C08K 3/36; C08K 9/06; B60C 1/0016
See application file for complete search history.

(56) References Cited

U.S. PATENT DOCUMENTS

| | | | |
|---|---|---|---|
| 2003/0114571 A1 | 6/2003 | Pan | |
| 2003/0216489 A1 | 11/2003 | Wang et al. | |
| 2015/0337124 A1 | 11/2015 | Magg | |
| 2017/0240774 A1 | 8/2017 | Devanne | |

FOREIGN PATENT DOCUMENTS

| | | | | | |
|---|---|---|---|---|---|
| CN | 101775158 A | | 7/2010 | | |
| EP | 3623171 A1 | | 3/2020 | | |
| JP | 2004002605 A | * | 1/2004 | | |
| JP | 2010083943 A | | 4/2010 | | |
| JP | 2013209464 A | | 10/2013 | | |
| WO | WO-2012073822 A1 | * | 6/2012 | ........... | C09C 1/3081 |

OTHER PUBLICATIONS

Machine English translation of WO 2012/073822, Saito et al., Jun. 7, 2012.*
Machine English translation of JP 2004-002605, Chikasawa et al., Jan. 8, 2004.*
Jia Zhixin et al: "Recyclable and self-healing rubber composites based on thermorevesible dynamic covalent bonding", Composites Part A: Applied Science and Manufacturing, Elsevier, Amsterdam, NL, vol. 129, Nov. 19, 2019 (Nov. 19, 2019), XP085974697, ISSN: 1359-835X, DOI: 10.1016/J.COMPOSITESA.2019.105709 [retrieved on Nov. 19, 2019] the whole document.
PCT International Search Report, Feb. 10, 2022, 4 pages.

* cited by examiner

*Primary Examiner* — Patrick D Niland
(74) *Attorney, Agent, or Firm* — Patterson Intellectual Property Law, PC

(57) ABSTRACT

The invention provides diene rubber-silica compounds comprising a diene rubber matrix having dispersed therein a silica filler, wherein said silica filler is surface-modified by attachment of a π system-containing moiety which forms a π-π interaction with the diene rubber matrix. In particular, it provides such compounds in which the diene rubber is styrene-butadiene rubber. Such compounds can be vulcanized and are suitable for producing vehicle tire components, such as tire treads.

16 Claims, 7 Drawing Sheets a)

b)

a)

b)

RUBBER COMPOUNDS FOR USE IN PRODUCING VEHICLE TIRES

FIELD OF THE INVENTION

Figure 1:
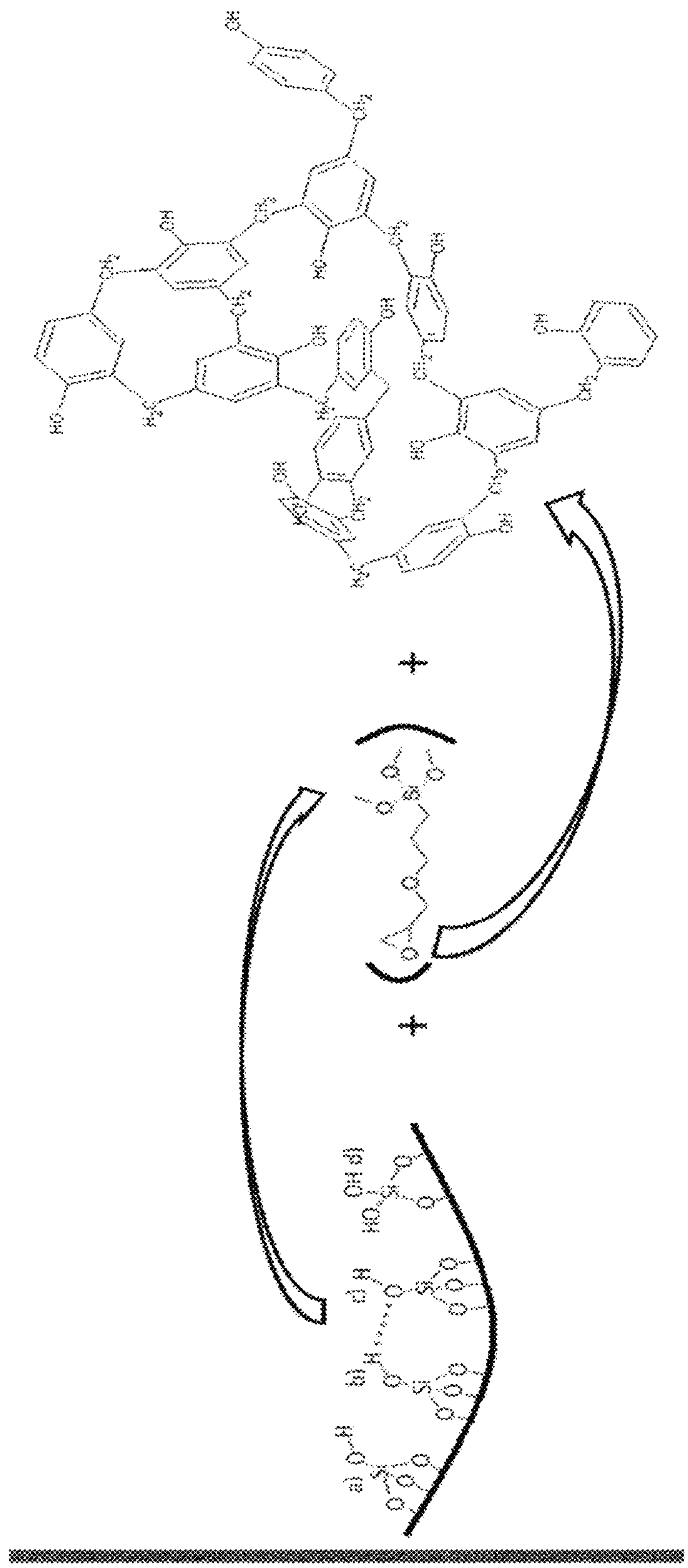

The present invention relates to diene rubber compounds which can be recycled, to processes for their preparation, and their use in the manufacture of vehicle tires and vehicle tire components. In particular, it relates to the use of the compounds to produce tire treads.

More specifically, the invention relates to modified silica for use as a reinforcing filler in diene rubber compounds. The surface of silica is modified by linkage of π system-containing moieties which are capable of forming a reversible π-π interaction with the polymeric chains of the diene rubber. This reversible interaction advantageously improves the recyclability of the rubber compounds whilst improving their mechanical performance.

BACKGROUND OF THE INVENTION

Diene rubbers, such as natural rubber, isoprene rubber and butadiene rubber, comprise repeat units derived from diolefins having a conjugated carbon-carbon double bond. The properties of synthetic diene rubbers can be specifically tailored by copolymerisation of diolefin monomers with other monomers and they are used in a wide range of applications.

Styrene-butadiene rubber (referred to herein as "SBR") is one example of a butadiene rubber produced by polymerisation of styrene and butadiene. The ratio of styrene to butadiene influences the properties of the polymer and various types of SBR find use in the automotive industry, particularly as components of car tires such as tire treads. When used in the manufacture of tire treads, SBR is typically cross-linked using the sulfur vulcanisation system. Its mechanical properties are improved using various reinforcing fillers, such as silica and carbon black. Carbon black was the first material in common use as a filler, but more recently silica has largely replaced the traditional use of carbon black in SBR-based compounds. The use of silica fillers improves rubber properties such as lowering rolling resistance and improving traction, particularly on wet surfaces. Other diene rubbers, including butadiene rubber (BR), natural rubber (NR), isoprene rubber (IR), epoxidised natural rubber (ENR), acrylonitrile-butadiene rubber (NBR), chloroprene rubber (CR), isobutylene-isoprene rubber (IIR), styrene-isoprene-butadiene rubber (SI BR) and ethylene-propylene-diene rubber (EPDM) are also commonly used to produce components in the automotive industry. As with SBR-based compounds, the mechanical properties of rubber compounds made from any diene rubber may similarly be improved by the incorporation of reinforcing fillers such as silica.

Dispersion of any reinforcing filler and the filler-rubber interaction are key when preparing high performance rubber compounds having the required mechanical properties. The presence of polar silanol groups on the surface of silica makes it acidic and moisture adsorbing which can lead to its aggregation and thus poor dispersion in the rubber matrix, causing high compound viscosity and loss of reinforcing properties. Various treatments of silica have been proposed to tailor its surface chemistry, such as the use of silanes as surface modifiers or "compatibilising agents". Silane coupling agents, such as bis(3-triethoxysilylpropyl)tetrasulfide (TESPT) and bis(3-triethoxysilylpropyl)disulfide (TESPD), are also used to form covalent bonds between silica and diene rubber chains, for example chains of SBR. These improve filler dispersion in the diene rubber matrix and strengthen the interaction between silica and rubber to reinforce the rubber compounds.

Vehicle tires have a limited lifespan due to general wear and tear, and degradation of the tire tread, etc. and can present a significant problem as a waste material. They take up valuable space in landfill sites and do not generally biodegrade. There is therefore an ongoing need to improve the sustainability of rubber compounds used in the manufacture of tires. The ability to recycle such materials for use as a secondary raw material which can be mixed with other new raw materials is the subject of much research. One of the most difficult types of tire material to recycle is diene rubber filled with silica, such as SBR-silica, due to the existence of strong covalent bonds between the rubber chains and the silica filler formed by silane coupling agents. In order to recycle such materials, it is necessary to break the covalent bonds since any remaining covalent bonds inhibit flow, compatibility, and can co-cross link when the recycled materials are mixed with other new polymers. That makes recycling difficult and generally uneconomical.

There are two types of covalent bond present in conventional diene rubbers which are reinforced with silica, such as SBR-silica compounds. One is the sulfur cross-links which arise from the sulfur vulcanisation system used to harden the rubber. The other is the coupling between the diene rubber chains and silica via the use of silane coupling agents such as those described above. It is these covalent interactions which severely restrict the re-use of rubbers, such as SBR-silica compounds, as raw materials due to the large amount of energy required to break the covalent bonds.

Although silica-containing diene rubber compounds, such as SBR-silica compounds, have become preferred for use in the manufacture of passenger car tires, there is thus a need for alternative fillers for rubber compounding which can maintain, or improve, tire performance properties whilst improving their recyclability.

SUMMARY OF THE INVENTION

The inventors now propose a modified silica filler which can form a reversible interaction with the rubber chains in a diene rubber compound. It is proposed that this modified silica can effectively replace covalent silane coupling in conventional diene rubber-silica compounds thereby enabling the compounds to be recycled more readily whilst still retaining their desired mechanical properties. Specifically, the inventors propose modification of the silica surface by attachment of a π system-containing moiety which is capable of forming a reversible π-π interaction with the polymeric diene rubber. The interaction between the π system-containing moiety and the silica surface may involve chemical bonding (for example, covalent attachment) or it may involve any other attractive interaction such as physical adsorption, hydrophobic interactions, dipole-dipole interactions, dipole-induced dipole interactions, reversible click-bonding or hydrogen bonding, or any combination thereof. The silica filler can be "pre-modified" by attachment of the π system-containing moiety to its surface before it is dispersed in the diene rubber matrix. Alternatively, it can effectively be modified in-situ as part of the compounding process to produce the diene rubber-silica compound.

Ionic liquids such as 1-allyl-3-methyl-imidazolium chloride (AMI) have been proposed for use in natural rubber compounds (see, for example Zhang et al., *J. Appl. Polym. Sci.* 134: 44478, 2017) to strengthen the interaction between silica and natural rubber. In this earlier work, the interaction between silica and the ionic liquid is a weak non-covalent hydrogen bond and there is a cation-π interaction between the ionic liquid and the rubber chains. More recently, Qian et al. (*Polymer Composites* 40: 1740, 2018) introduced both AMI and TESPT into SBR-silica compounds. They concluded that the use of multiple interactions of cation-π interactions, hydrogen bonding and covalent bonds between silica and the SBR chains was required to achieve the required dispersion as well as mechanical properties of the rubber compounds.

In contrast to earlier work involving the use of ionic liquids and multiple interactions of cation-π interactions, hydrogen bonding and covalent bonds between silica and the SBR chains, the inventors propose the use of functionalised silica in which the surface of the silica is modified by bonding to a π system-containing species. This has several important advantages. When using AMI, for example, the presence of chloride ions is highly undesirable since these increase the risk of degradation and thus premature aging of the rubber compounds. In Qian et al. the proposal to use TESPT in addition to AMI to provide the desired multiple interactions between silica and the SBR chains also involves covalent bonding between the silica and rubber chains. That can result in a loss of elasticity of the material whilst also resulting in a material which cannot readily be recycled.

The present invention thus solves the problems relating to known silica-rubber compounds by providing modified silica fillers which not only retain the key performance characteristics of the rubber products, but which enhance their recyclability.

In one aspect the invention thus provides a diene rubber-silica compound comprising a diene rubber matrix having dispersed therein a silica filler, wherein said silica filler is surface-modified by attachment of a π system-containing moiety which forms a π-π interaction with the diene rubber matrix.

In another aspect, the invention provides a process for producing a diene rubber-silica compound as herein described, said process comprising the step of dispersing a silica filler in a diene rubber matrix, wherein said silica filler is surface-modified by attachment of a π system-containing moiety capable of forming a π-π interaction with the diene rubber matrix.

In another aspect, the invention provides a vulcanizable rubber composition comprising a diene rubber matrix having dispersed therein a silica filler, wherein said silica filler is surface-modified by attachment of a π system-containing moiety which forms a π-π interaction with the diene rubber matrix.

In another aspect, the invention provides a vulcanized rubber compound obtained by, directly obtained by, or obtainable by cross-linking a vulcanizable rubber composition as herein described.

In another aspect, the invention provides a process for producing a vulcanized diene rubber-silica compound, said process comprising the steps of introducing a silica filler into a diene rubber matrix whereby to produce a vulcanizable rubber compound; and subjecting said vulcanizable rubber compound to vulcanization by heating to a predetermined temperature and for a predetermined time, wherein said silica filler is surface-modified by attachment of a π system-containing moiety capable of forming a π-π interaction with the diene rubber matrix.

In another aspect, the invention provides the use of a diene rubber-silica compound as herein described as a component of a vehicle tire or in the manufacture of a component of a vehicle tire.

In another aspect, the invention provides a vehicle tire component made from a diene rubber-silica compound as herein described.

In another aspect, the invention provides a vehicle tire comprising a vehicle tire component as herein described.

In another aspect, the invention provides a method of recycling a diene rubber-silica compound as herein described, said method comprising the step of de-vulcanising said compound; and optionally recovering the diene rubber.

In another aspect, the invention provides a silica filler which is surface-modified by attachment of a π system-containing moiety capable of forming a π-π interaction with a diene rubber.

In another aspect, the invention provides a process for producing a silica filler as herein described, said process comprising the step of modifying silica by attachment of a π system-containing moiety capable of forming a π-π interaction with a diene rubber.

DETAILED DESCRIPTION OF THE INVENTION

In one aspect the invention relates to a diene rubber-silica compound comprising a diene rubber matrix having dispersed therein a silica filler, wherein said silica filler is surface-modified by attachment of a π system-containing moiety which forms a π-π interaction with the diene rubber matrix.

Unless otherwise specified, the terms "rubber compound" and "rubber composition" are used interchangeably herein and refer to a rubber which is blended or mixed (i.e. compounded) with various components or materials. A "diene rubber-silica compound" refers to a diene rubber which is mixed with a silica filler.

The invention relates to rubber compounds and rubber compositions both in the raw state (i.e. before curing or vulcanisation) and in the cured or vulcanised state, i.e. after cross-linking or vulcanisation.

As used herein, the term "diene rubber" refers to a rubber comprising repeat units derived from at least one conjugated diolefin monomer. It includes homopolymers and copolymers having one or more additional units derived from monomers copolymerisable with the diolefin monomer(s). The repeat units have a carbon-carbon double bond which may be present in the backbone and/or in a side-chain of the polymer. A diene rubber may be natural or synthetic. Non-limiting examples of diene rubbers include butadiene rubber (BR), natural rubber (NR), isoprene rubber (IR), epoxidized natural rubber (ENR), acrylonitrile-butadiene rubber (NBR), chloroprene rubber (CR), isobutylene-isoprene rubber (IIR), styrene-butadiene rubber (SBR), styrene-isoprene-butadiene rubber (SI BR) and ethylene-propylene-diene rubber (EPDM).

In one embodiment, the diene rubber for use in the invention contains repeat units derived from butadiene. Examples of such rubbers include, but are not limited to, styrene butadiene rubber (SBR) and butadiene rubber (BR). In one set of embodiments, the diene rubber for use in the invention is SBR.

The term "π-π interaction" as used herein refers to the interaction between two π systems. By "π system" is meant any group having a system of connected p orbitals with delocalised electrons. Examples of such groups include aromatic rings, such as phenyl rings, as well as carbon-carbon double bonds. A π-π interaction between aromatic rings may result in a stacked arrangement of molecules which is adopted due to interactions between their π systems. This is generally known as "π-π stacking".

The π-π interaction which is described herein involves the interaction between a π system-containing moiety which is provided on the silica filler and at least one type of electron-rich π system in the diene rubber polymer. The electron-rich π system in the diene rubber may be provided by a π bond which forms part of a carbon-carbon double bond. The carbon-carbon double bond may, for example, form part of the backbone of the diene rubber polymer or it may be present in a side-chain or in a terminal group. An electron-rich π system may also be associated with other substituent groups present in the diene rubber, for example any aromatic group (e.g. phenyl) or heteroaromatic group which may be present in the backbone of the polymer or as part of a side-chain. Alternatively, or in addition, the π-π interaction which is described herein may thus also involve the interaction between the π system-containing moiety which is provided on the silica filler and an electron-rich π system of an aromatic or heteroaromatic group present in the polymer, for example a phenyl ring in the case where the diene rubber is SBR. As will be understood, multiple π-π interactions may be involved, for example where the π system-containing moiety provided on the silica filler contains a plurality of π systems.

It is intended that the primary interaction between the modified silica and diene rubber matrix in the rubber compounds herein described is a π-π interaction. Other interactions between the silica and diene rubber matrix may be present, including both covalent and other non-covalent interactions. However, the presence of any additional covalent interactions should be minimised to achieve the desired aim of recyclability of the rubber compounds. In one embodiment, there will be a substantial absence of any covalent interactions between the silica and the diene rubber chains, such as those arising from the presence of conventional coupling agents such as bifunctional silanes. By "substantial absence" is meant that the extent of covalent bonding between the silica and diene rubber chains is less than 1 mol of covalent linkages per 1 mol of diene rubber, preferably less than 0.5 mol per 1 mol, e.g. less than 0.3 mol per 1 mol. It may be understood that the rubber compounds will be substantially free from (e.g. free from) any coupling agents which covalently bind the silica to the diene rubber. Other reversible non-covalent interactions which may be present between the silica and the diene rubber chains can include any of the following and combinations thereof: electrostatic, cation-π bonding, van der Waals forces, hydrogen bonding and hydrophobic effects. In one embodiment, the interactions between the silica and diene rubber chains may include π-π interactions, hydrophobic effects and hydrogen bonding. In another embodiment, however, the only interaction will be a π-π interaction as herein described.

The term "silica filler" as used herein refers to particulate silica. Any known type of particulate silica capable of reinforcing a diene rubber matrix may be used in the invention. As will be understood, known silica materials typically contain a proportion of other components (e.g. as impurities), but the main component will be silicon dioxide, i.e. $SiO_2$. The content of silicon dioxide will generally be at least 90 wt. %, preferably at least 95 wt. %, e.g. at least 97 wt. %.

Silica materials for use in the invention are well known in the art and include, in particular, precipitated silica (an amorphous form of silica), pyrogenic (fumed) silica, wet silica (hydrous silicic acid), dry silica (silicic anhydride), calcium silicate and aluminium silicate. A single silica or combination of two or more types of silica may be used. The silica is used in the form of discrete particles, i.e. as a granulate which is highly dispersible. It may be monodisperse in size and uniform in shape. Alternatively, it may be provided in the form of branched or linear clusters. Precipitated silica is preferred in view of its ability to impart to tread compounds excellent rolling resistance and wet traction. Silica for use in the invention may have a specific surface area (e.g. nitrogen-specific absorption surface area) in the range of from 50 to 350 $cm^2/g$, preferably from 80 to 280 $cm^2/g$, for example from 120 to 230 $cm^2/g$. The average particle size of the silica may range from about 5 nm to about 50 nm, preferably from about 8 nm to about 35 nm, e.g. from about 10 nm to about 28 nm. Commercial grades of silica for use in the invention are widely available from suppliers such as Evonik (Germany) and include, for example, Ultrasil® 7000 GR and Ultrasil® VN3.

Silica for use in the invention is surface-modified by linkage to at least one π system-containing moiety capable of forming a π-π interaction with the diene rubber matrix. As herein described, the silica may be "pre-modified" to carry the π system-containing moiety or it may be modified in-situ. By "linkage" it is intended that the silica may be attached to the π system-containing moiety by at least one type of chemical or physical interaction which is attractive. In one embodiment, the silica is chemically bound to at least one π system-containing moiety. For example, it may be chemically bound via covalent or non-covalent bonding (e.g. hydrogen bonding or electrostatic bonding). Alternatively, the silica may be attached to at least one π system-containing moiety by a physical interaction, for example by cation-π bonding, van der Waals forces, a dipole-dipole interaction, a dipole-induced dipole interaction, a reversible click-bond or hydrophobic effects.

The silica for use in the invention may be surface-modified as described herein with a plurality of π system-containing moieties. Where more than one such moiety is present, these may be the same or different. Typically, however, where a plurality of such moieties are present these will be the same chemical entity.

In some embodiments, the silica surface may also be modified by attachment of one or more additional functional groups. Such functional groups may be non-polar or polar in nature and suitable groups may readily be selected by those skilled in the art. The silica may, for example, be surface-treated to decrease the filler-filler interaction during compounding and thus to improve its dispersibility in the rubber matrix. Compatibilising agents (also known as "covering agents") suitable for this purpose are well known in the art and include, but are not limited to, monofunctional silanes such as hexadecyltrimethoxysilane or propyltriethoxysilane. Other non-polar species which may be attached to the surface of the silica particles include aromatic groups and saturated aliphatic hydrocarbons. In some embodiments, the silica surface may be functionalised with one or more polar functional groups such as those containing amine or carboxyl groups.

In one embodiment, the silica for use in the invention will only be modified with one or more π system-containing moieties as herein described, i.e. no other types of functional group will be bound to its surface.

Each π system-containing moiety which is attached to the silica surface will contain at least one π system as herein defined. In some cases, each π system-containing moiety may contain more than one π system. Where more than one π system is present these may be the same or different but typically they will be the same. Typically, the π system-containing moiety will contain a plurality of π systems which are capable of forming the intended π-π interaction with the diene rubber matrix. For example, it may contain up to 30 π systems, for example from 5 to 25 π systems or from 10 to 20 π systems.

It is envisaged that a range of π system-containing moieties may be employed in the invention and suitable moieties can readily be selected by those skilled in the art having in mind its intended function. For example, it will be understood that any π system-containing moiety should not have any adverse impact on any of the remaining components of the rubber compound as herein described, or in respect of the rubber compound itself or its physical and mechanical properties.

Examples of π system-containing moieties for use in the invention are organic compounds and residues of such compounds containing at least one of the following π systems: optionally substituted aromatic or heteroaromatic rings (e.g. optionally substituted phenyl, furanyl, or pyridinyl), a tropylium cation, an allyl group, or an acrolein group. Optional substituents which may be present on any of these π systems include, but are not the limited to, any of the following: $C_{1-6}$ alkyl, $C_{1-6}$ alkoxy, —NR'$_2$, —OC(O)NR'$_2$ (where each R' is independently H or $C_{1-3}$ alkyl), and —COOR" (where R" is H or $C_{1-6}$ alkyl). More than one substituent may be present on any given π system. Where more than one substituent is present, these may be the same or different.

In one embodiment, the π system-containing moieties for use in the invention will contain at least one substituted or unsubstituted phenyl or phenol group. In one embodiment, these will contain a plurality of such groups, preferably up to 30 optionally substituted phenyl or phenol groups, for example from 5 to 25 optionally substituted phenyl or phenol groups. Where these rings are additionally substituted, these may be substituted by one or more groups (e.g. 1 to 3, or 1 or 2 groups) independently selected from $C_{1-6}$ alkyl, $C_{1-6}$ alkoxy, —OC(O)NR'$_2$ (where each R' is independently H or $C_{1-3}$ alkyl), and —COOR" (where R" is H or $C_{1-6}$ alkyl). In one embodiment, these rings do not include any additional substituents.

Suitable π system-containing moieties for use in the invention can readily be selected by those skilled in the art having in mind their intended function and include, but are not limited to, polyphenyl compounds, such as polyphenyl ethers, polyphenyl sulfides, polyphenyl sulfones and polyphenylene vinylenes, and synthetic resins, such as those containing aromatic ring systems.

Synthetic resins may be selected from the group consisting of phenolic resins, aromatic hydrocarbon resins, hydrogenated aromatic hydrocarbon resins, aliphatic/aromatic hydrocarbon resins, hydrogenated aliphatic/aromatic hydrocarbon resins, cycloaliphatic/aromatic hydrocarbon resins, hydrogenated cycloaliphatic/aromatic hydrocarbon resins, polyterpene resins, terpene-phenol resins, coumarone-indene resins, grafted versions of any of such resins and any mixtures thereof. Any of these resins may be partially hydrogenated, for example substantially hydrogenated. Preferably, however, their degree of hydrogenation is such as to minimise hydrogenation of aromatic groups. Synthetic resins which contain a high proportion of aromatic groups (e.g. phenyl or phenol groups) are particularly suitable. An aromatic content of at least 40% (based on molecular formula), for example at least 50%, may be appropriate.

Resins suitable for use in the invention may have a melting point, $T_m$, in the range of from about 70 to about 120° C., for example in the range from about 70 to about 100° C. In some embodiments, these may have a lower melting temperature. For example, in the case of low molecular weight liquid hydrocarbon resins the melting temperature may be as low as 0-5° C. Suitable resins may have a softening point, $T_s$, in the range from about 70 to about 130° C., for example in the range from about 90 to about 130° C.

Examples of aromatic hydrocarbon resins include those containing monomer units derived from vinyl toluene, dicyclopentadiene, indene, methylstyrene, styrene and methylindene. Aromatic resins are well known and are readily available from commercial sources. These include Picco™ 2215, Picco™ 5120, Picco™ 6100, Picco™ A10, Picco™ A100, Picco™ A120 and Picco™ A140 available from Eastman Chemical Company, for example.

Synthetic resins which are particularly suitable for use in the invention include the phenolic resins. As used herein, the term "phenolic resin" refers to phenol formaldehyde resins. Specifically, it refers to a synthetic thermosetting resin obtained by the reaction of at least one phenol or substituted phenol (i.e. a modified phenol) with at least one aldehyde. For example, it includes resins obtained by reaction of one or more of phenol, resorcinol, m-cresol, 3,5-xylenol, t-butylphenol, and p-phenylphenol with at least one aldehyde selected from formaldehyde, acetaldehyde, chloral (trichloroacetaldehyde), butyraldehyde, furfural and acrolein (propenal).

Suitable phenolic resins for use in the invention include the novolac and resole phenolic resins. Novolac phenolic resins are made with acid catalysts and have a molar ratio of formaldehyde to phenol of less than 1, typically between 0.1:1 and to provide methylene linked phenolic oligomers. The excess of phenol results in polymer chains that have phenolic end groups. Resole phenolic resins are made with alkali catalysts and have a molar ratio of formaldehyde to phenol of greater than 1, typically from 1:1 to 3:1, to give phenolic oligomers with methylene and benzylic ether-linked phenol units. Excess formaldehyde results in polymers having pendant methylol groups.

Novolac and resole phenolic resins may be chemically modified, or they may unmodified. Both modified and unmodified types of these resins find used in the invention. Modified resins may be prepared by replacing a proportion of the phenol with one or more substituted phenols. For example, modified phenols derived from shells of the cashew nut may be employed to provide so-called "cashew-modified phenolic resins". Other modified phenolic resins include those which are oil modified (e.g. using phenols obtained from tall oil), alkylphenol modified, or cresol modified.

Novolac resins for use in the invention may, for example, include those having the following chemical structure:

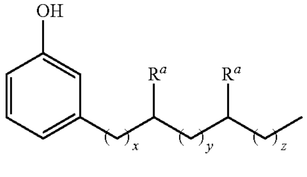

wherein:

x is an integer from 1 to 10;

y is an integer from 1 to 10;

z is an integer from 1 to 10; and

R a is a group of the formula:

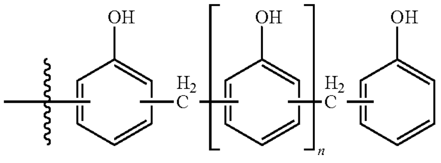

in which n is an integer from 1 to 10.

Phenolic resins are well known and readily available from various commercial sources. Examples of commercially available novolac phenolic resins include those available from Sumitomo Bakelite Co., Ltd. (Japan) in the SUMILITERESIN® series. These include the following solid novolak resins: PR-12686, PR-NR-1, PR-13349, PR-50731, and Durez 19900, and the following powder novolac resins: PR-217, PR-7031A, PR-12687 and PR-13355.

The π system-containing moiety is attached to the surface of the silica. In one embodiment, it is attached to the surface of the silica via at least one covalent bond, i.e. it is covalently bound. In one embodiment, it may be attached by more than one covalent bond, for example by two covalent bonds. However, typically it will be attached by a single covalent bond.

The π system-containing moiety can be directly attached to the surface of the silica. By directly attached it is meant via a direct chemical or physical bond. For example, it may be attached via a direct covalent bond. Conveniently, however, the π system-containing moiety may be attached to the silica surface via a suitable linking group. This linking group should form a bond (e.g. a covalent bond) to the silica surface and an additional bond (e.g. a covalent bond) to the π system-containing moiety thereby serving to link the two entities. In one embodiment, the π system-containing moiety is attached to the linking group by a covalent bond. In another embodiment, the π system-containing moiety can be attached to the linking group by hydrogen bonding. In another embodiment, the π system-containing moiety can be attached to the linking group by a combination of covalent bonds and hydrogen bonds. Due to the nature of the surface of silica which carries a plurality of silanol groups, the π system-containing moiety or the linking group which carries the π system-containing moiety, will typically be bound to the silica via a siloxane linkage.

Where the π system-containing moiety is linked to the silica surface via a linking group, it will be understood that the precise nature of the linking group is not critical provided it is capable of linking (e.g. covalently linking) the π system-containing moiety to the surface of the silica. As will be appreciated, the linking group should not include any components which will impact the performance of the rubber compound, for example any groups that may adversely interact with the diene rubber matrix. Suitable linking groups may readily be selected by those skilled in the art having in mind their intended function.

Typically, the linking group will be an organic group having a backbone chain containing up to 16 atoms, preferably up to 12 atoms, for example from 2 to 8 atoms, between its point of attachment to the silica surface and to the selected cationic moiety. It may, for example, contain up to 12 carbon atoms, for example from 2 to 8 carbon atoms. Linking groups may be linear or branched and they may carry one or more substituent groups.

The linking group may, for example, be represented by:

(I)

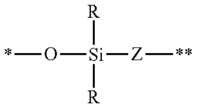

or (II)

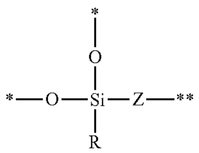

in which

* denotes a point of attachment of the linking group to the silica surface;

** denotes the point of attachment of the linking group to a π system-containing moiety;

each R is independently selected from —OH, $C_{1-6}$ alkoxy (preferably $C_{1-3}$ alkoxy) and $C_{1-6}$ alkyl (preferably $C_{1-3}$ alkyl); and Z is an optionally substituted $C_{1-12}$ alkylene group which may be interrupted by one or more groups selected from —O—, —SiR'$_2$— (in which each R' is independently —OH, $C_{1-6}$ alkoxy or $C_{1-6}$ alkyl), —PR"—, —NR"— and —OP(O)(OR")O— (in which R" is H or $C_{1-6}$ alkyl, preferably $C_{1-3}$ alkyl, e.g. methyl).

In one set of embodiments, each R in formula (I) or formula (II) is independently selected from —OH, $C_{1-3}$ alkoxy and $C_{1-3}$ alkyl. For example, each R may independently be selected from —OH, $C_{1-2}$ alkoxy and $C_{1-2}$ alkyl. Typically, all R groups may be —OH.

In one set of embodiments, group Z in formula (I) and formula (II) may be an optionally substituted $C_{1-12}$ alkylene, preferably $C_{1-8}$ alkylene, for example $C_{1-6}$ alkylene. Optional substituents include, for example, —OH and —NR" 2 (where each R" is independently H or $C_{1-6}$ alkyl, preferably H).

In one set of embodiments, group Z in formula (I) and formula (II) may be an optionally substituted $C_{1-12}$ alkylene, preferably $C_{1-8}$ alkylene, for example $C_{1-6}$ alkylene, optionally interrupted by one or more —O— atoms, for example by one or two —O— atoms. Optional substituents include, for example, —OH and —NR" 2 (where each R" is independently H or $C_{1-6}$ alkyl, preferably H).

In one embodiment, the linking group may be represented by any of the following structures:

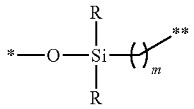
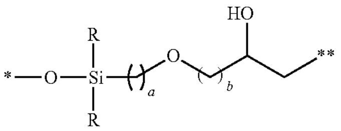
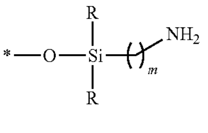
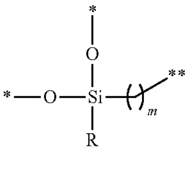

-continued

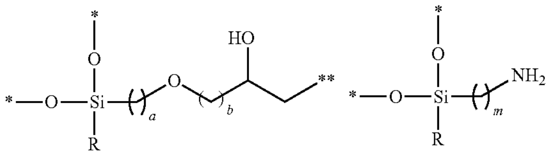

in which

* denotes a point of attachment of the linking group to the silica surface;

** denotes the point of attachment of the linking group to a π system-containing moiety;

each R is as herein defined;

m is an integer from 0 to 12, preferably from 1 to 8, or from 1 to 6, e.g. 1, 2 or 3;

a is an integer from 0 to 6, preferably from 1 to 3, e.g. 2 or 3; and b is an integer from 0 to 6, preferably from 1 to 3, e.g. 1 or 2.

In one embodiment, m is 3.

In one embodiment, a is 3 and b is 1.

Specific examples of linking groups include, but are not limited to, the following:

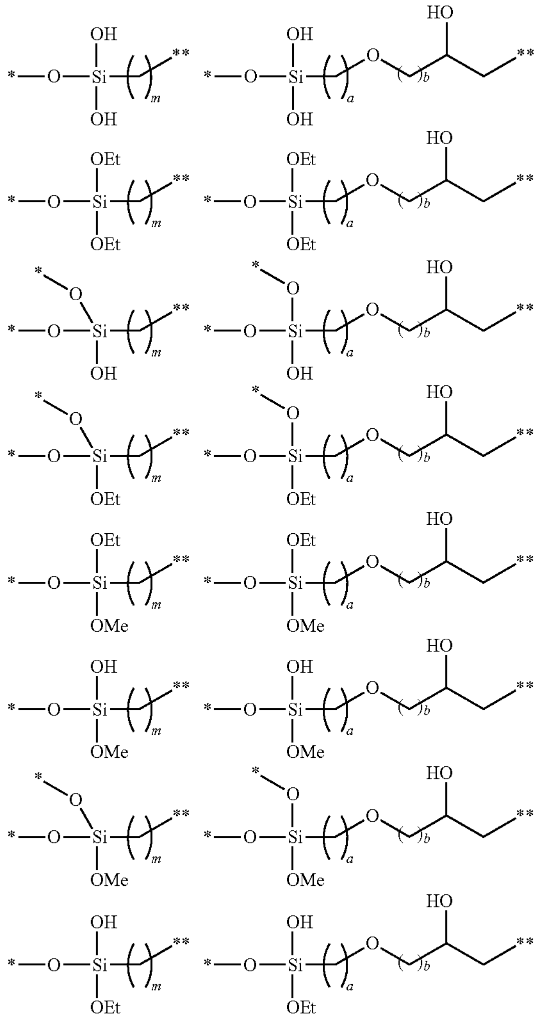

-continued

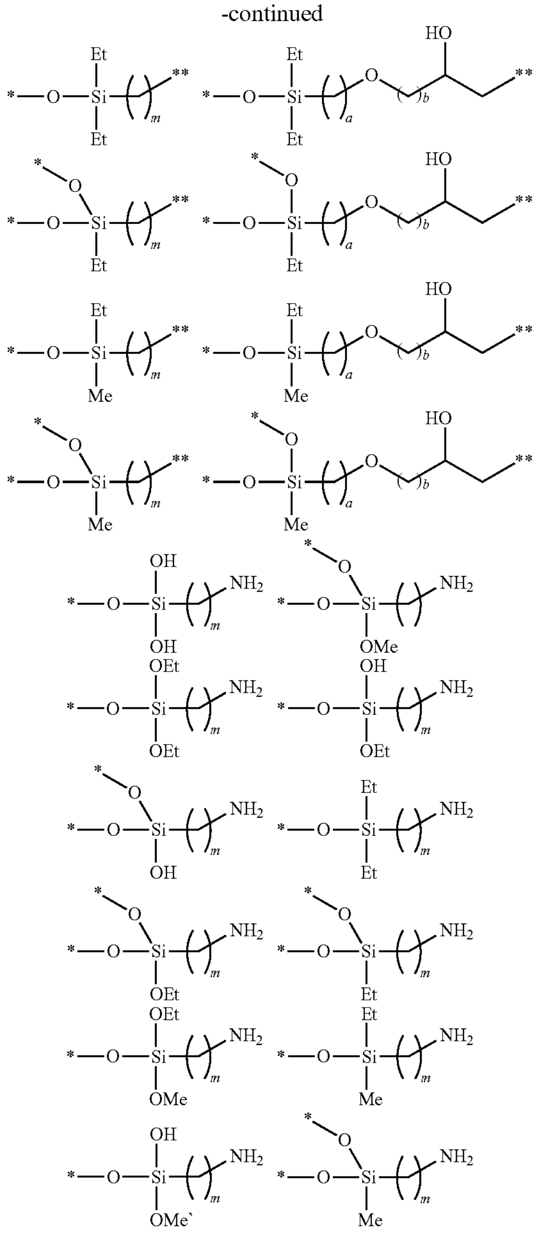

in which

* denotes a point of attachment of the linking group to the silica surface;

** denotes the point of attachment of the linking group to a π system-containing moiety; and m, a and b are as herein defined.

The term "alkyl" as used herein refers to a monovalent saturated, linear or branched, hydrocarbon chain. It may be substituted or unsubstituted. Where more than one substituent group is present, these may be the same or different. Examples of alkyl groups include, but are not limited to, methyl, ethyl, n-propyl, iso-propyl, n-butyl, iso-butyl, sec-butyl, tert-butyl, n-pentyl, iso-pentyl, neo pentyl, n-hexyl, etc. An alkyl group preferably contains from 1-6 carbon atoms, e.g. 1-4 carbon atoms.

The term "alkoxy" as used herein refers to an —O-alkyl group, wherein alkyl is as defined herein. Examples of alkoxy groups include, but are not limited to, methoxy, ethoxy, propyloxy, etc. Unless otherwise specified, any alkoxy group may be substituted in one or more positions with a suitable substituent. Where more than one substituent group is present, these may be the same or different.

The term "alkylene" as used herein refers to a saturated, linear or branched divalent carbon chain. Examples of alkylene groups include, but are not limited to, methylene ($—CH_2—$), ethylene ($—CH_2CH_2—$), propylene ($—CH_2CH_2CH_2—$), etc. Unless otherwise specified, any alkylene group may be substituted in one or more positions with a suitable substituent. Where more than one substituent group is present, these may be the same or different.

Where any of the groups herein described are substituted, any substituents may be the same or different and may be selected from any of the following: $C_{1-3}$ alkyl (e.g. $—CH_3$), $C_{1-3}$alkoxy (e.g. $—OCH_3$), —OH and $—NR^6_2$ (wherein each $R^6$ is independently H or $C_{1-6}$ alkyl, preferably $C_{1-3}$ alkyl, e.g. $—CH_3$).

Suitable combinations of linking groups and π system-containing moieties can readily be selected by those skilled in the art. As will be understood, the precise nature of the interaction between these species will be dependent on the selected groups. Linkage of these components may, in some cases, require that one or both of the components are appropriately functionalised, for example by incorporation of one or more reactive groups which enable their linkage or interaction with one another, such as the formation of a covalent bond or any other type of bonding as herein described. Functionalised π system-containing moieties may, for example, carry one or more reactive groups such as hydroxyl, amine, carboxyl, etc., which enable their linkage to the chosen linking group. Any suitable functional group may be used and these may readily be selected by those skilled in the art depending on the nature of the components which are to be linked to one another.

In one set of embodiments, the linking group may be formed from the reaction of a bifunctional silane with the silica surface and with the selected π system-containing moiety, such as a phenolic resin or an aromatic hydrocarbon resin. Bifunctional silanes are well known in the art for use in the production of rubber compounds and include, for example, epoxy silanes, amino silanes, isocyanate silanes, mercapto silanes and vinyl silanes. The chemistry of such agents is well known and the skilled chemist can readily determine appropriate methods for their reaction with silica and with the selected π system-containing moiety. Generally, under the selected reaction conditions, at least one hydrolysable group present in the silane will be hydrolysed to form a reactive silanol which can form a siloxane linkage to the surface of the silica. When attaching a phenolic resin, for example, the epoxy group present in an epoxysilane can be reacted with the resin to form a strong covalent bond. When using an aminosilane, the amine group can be reacted with a phenolic resin to form a hydrogen bond. An isocyanate group present in an isocyanate silane can react with active hydrogens in a phenolic resin to form a weak covalent bond. Where the π system-containing moiety is an aromatic hydrocarbon resin, for example, a mercaptosilane may form sulfidic bridges with any unsaturated bonds present in the resin. If the aromatic hydrocarbon resin contains saturated bonds, a vinylsilane may be employed in the presence of a peroxide to generate radicals on the resin chains can be used to form an attachment to the resin.

It will be understood that following linkage of the different components, for example via a chemical reaction, to form the modified silica as herein described some or all of the components may no longer retain their original structure but may effectively lose one or more terminal groups or atoms (e.g. a H atom) as a result of the reaction involved in their linkage or interaction with one another (e.g. by the formation of a covalent bond or any other type of bonding as herein described). These components may be considered a "residue" of the original component and any reference herein to a "residue" of a compound should be construed accordingly.

In one embodiment, the π system-containing moiety which is linked to the silica surface is selected from one of the following structures:

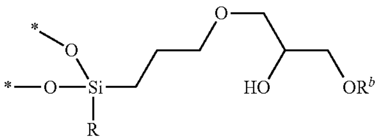

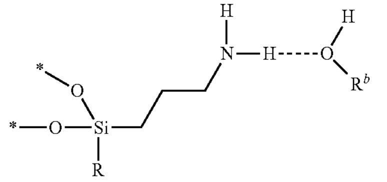

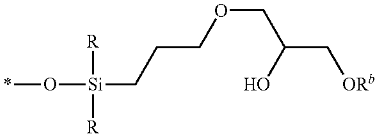

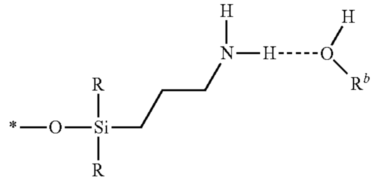

wherein * denotes the point of attachment to the silica;

R is as herein defined;

$R^b$ denotes the residue of a π system-containing moiety, e.g. the residue of a phenolic resin; and

- - - denotes a hydrogen bond.

The surface-modified silica as herein described can be prepared using methods known in the art. The precise method used will depend on the nature of the linking group (if present) and the π system-containing moiety or moieties but can readily be selected by those skilled in the art. Typically a compound which is capable of forming a covalent bond to the surface of the silica and an additional bond (e.g. a covalent bond) to the selected π system-containing moiety may be used and which will form the linking group as herein defined. For example, the method may involve reaction between silica, a compound capable of forming the linking group (e.g. any of the bifunctional silanes mentioned herein) and a compound which contains the selected π system-containing moiety (e.g. any of the resins herein described).

Formation of the surface-modified silica is typically carried out in stepwise fashion, for example in which the linking group is initially bound (e.g. covalently linked) to the surface of the silica followed by reaction with a compound containing the π system-containing moiety. Alternatively, the linking group may initially be bound (e.g. covalently linked) to the π system-containing moiety followed by linkage (e.g. covalent linkage) to the silica. An example of a stepwise reaction is schematically illustrated in FIG. 1 in which the linking group is formed from (3-glycidyloxypropyl)trimethoxysilane which reacts with the surface of the silica in a first step. In a second step, a phenolic resin which contains a plurality of π systems is grafted to the silica surface by reaction with the pre-modified silica. In this example the phenolic resin is an alkyl phenol-formaldehyde resin, i.e. polyoxybenzylmethylenglycolanhydride. In another embodiment, the surface-modified silica can be formed in a single one-step reaction involving all reactants.

Suitable solvents and conditions for the reaction, or for each step of the reaction, may readily be selected by those skilled in the art depending on the nature of the reactants. In any reaction involving ring opening of an epoxy ring, it may be appropriate to employ a pH adjusting agent, for example one capable of increasing the pH. Suitable pH adjusting agents include alkaline agents such as DPG (diphenyl guanidine), NaOH and KOH.

Examples of methods for preparation of a modified-silica for use in the invention are shown in the schemes below:

Scheme 1

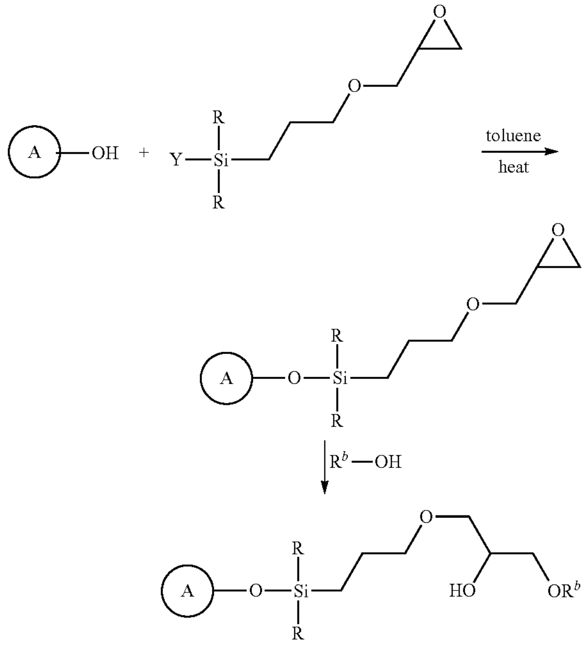

wherein A represents a silica particle;

Y is —OH or any hydrolysable group, for example $C_{1-6}$ alkoxy;

R is as herein defined; and $R^b$—OH represents a π system-containing moiety, for example a phenolic resin.

Scheme 2

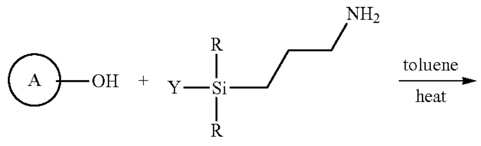

-continued

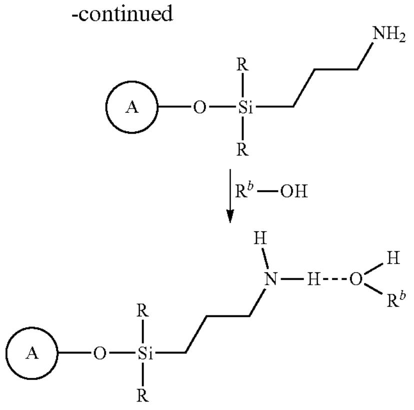

wherein A represents a silica particle;

Y is —OH or any hydrolysable group, for example $C_{1-6}$ alkoxy;

R is as herein defined;

$R^b$—OH represents a π system-containing moiety, for example a phenolic resin; and

- - - denotes a hydrogen bond.

Following the reaction to form the surface-modified silica, any ungrafted material may be removed using conventional methods, such as by washing with a suitable solvent, or by Soxhlet extraction in water. If necessary, any residual solvent can be removed, for example by drying at elevated temperature.

Following preparation of the surface-modified silica, FTIR analysis can be used to determine the success of the reaction as described in the examples. If appropriate, the yield of modified silica can be determined by methods known in the art such as thermogravimetric analysis (TGA).

The methods described above relate to the preparation of a "pre-modified" silica for subsequent incorporation into the rubber to produce the desired diene rubber-silica compound. An alternative to these methods is to prepare the surface-modified silica in situ. In such methods, the components required to form the surface-modified silica are added to the rubber during compounding. In addition to the silica, these components will include a compound which contains the selected π system-containing moiety and, optionally, a compound capable of forming the desired linking group. For example, a phenolic resin, a silane (capable of reaction to form a linking group) and silica may be added together to the rubber.

The surface-modified silica herein described and methods for its preparation form further aspects of the invention.

In another aspect, the invention thus provides a silica filler which is surface-modified by attachment of a π system-containing moiety capable of forming a π-π interaction with a diene rubber.

In another aspect, the invention provides a process for producing a silica filler as herein described, said process comprising the step of modifying silica by attachment (e.g. covalent attachment) of a π system-containing moiety capable of forming a π-π interaction with a diene rubber.

The surface-modified silica which is herein described acts as a reinforcing filler in the diene rubber matrix. The term "diene rubber matrix" refers to an elastomeric matrix which comprises a diene rubber.

Any known diene rubber can be used in the invention and those skilled in the art can readily select a suitable rubber having in mind the intended use of the silica-diene rubber compound. Diene rubbers are well known in the art and include both natural and synthetic rubbers. Non-limiting examples of such rubbers include butadiene rubber (BR), natural rubber (NR), isoprene rubber (IR), epoxidized natural rubber (ENR), acrylonitrile-butadiene rubber (NBR), chloroprene rubber (CR), isobutylene-isoprene rubber (IIR), styrene-butadiene rubber (SBR), styrene-isoprene-butadiene rubber (SI BR) and ethylene-propylene-diene rubber (EPDM).

Diene rubbers can be modified with one or more functional groups and any such functionalised diene rubbers may be used in the invention. Where the diene rubber is functionalised, any of its polymer backbone, terminal groups and/or side chains may be bound to one or more functional groups. These functional groups may be incorporated into the polymer material during its production or, alternatively, they may be subsequently grafted onto the polymer. The type and position of any functional groups varies in different rubber grades known in the art. The choice of any functionalised rubber will depend on the intended use of the rubber compounds herein described. Examples of functionalised diene rubbers include those which carry one or more reactive groups (e.g. alkoxysilyl groups) and/or one or more interacting groups (e.g. amino groups). Interacting groups such as amino groups may, for example, form hydrogen bonds within the rubber matrix. In one embodiment, the diene rubber for use in the invention is unfunctionalised.

In one set of embodiments, the diene rubber for use in the invention is one suitable for use in the production of a rubber compound which can be used as a tire component, such as a tire tread. The diene rubber to be used in the invention may, for example, be functionalised or unfunctionalised styrene butadiene rubber (SBR). Unfunctionalised SBR is particularly preferred.

Styrene-butadiene rubber is well known in the art. The term "styrene-butadiene rubber" or "SBR" as used herein is intended to refer generally to any synthetic rubber made by polymerisation of styrene and butadiene monomers. It thus refers to any styrene-butadiene copolymer. SBR is commonly used in the tire industry and can be made by well-known methods, such as by co-polymerisation of the corresponding monomers in emulsion, suspension or in solution. Styrene and butadiene monomers may be selected in suitable ratios according to the intended use and properties of the rubber compound. For example, styrene may be present in an amount of up to 80 wt. %, more typically up to about 45 wt. % for rubber tire tread compounds (wt. % based on the total weight of the comonomers). The diene component will generally be present in an amount of at least 50 wt. %. Tread compounds are required to have good viscoelastic properties due to their road contact when in use, as well as properties such as rolling resistance and traction on wet surfaces. Suitable amounts of styrene to achieve such properties are well known in the tire industry and may readily be selected by those skilled in the art.

The selected diene rubber can be used as 100 parts of the rubber in the compounds herein described, or it may be blended with any conventionally employed elastomer for rubber compounding or blends thereof, including both natural and synthetic rubbers. Blends of different diene rubbers may be used. Rubbers suitable for use in any blend are well known to those skilled in the art and include natural rubber, synthetic polyisoprene rubber, styrene-isoprene rubber, styrene-butadiene rubber, styrene-isoprene-butadiene rubber, butadiene-isoprene rubber, polybutadiene, butyl rubber, neoprene, acrylonitrile-butadiene rubber (NBR), silicone rubber, fluoroelastomers, ethylene acrylic rubber, ethylene-propylene rubber, ethylene-propylene terpolymer (EPDM), ethylene vinyl acetate copolymer, epichlorohydrin rubber, chlorinated polyethylene-propylene rubbers, chlorosulfonated polyethylene rubber, hydrogenated nitrile rubber, and tetrafluoroethylene-propylene rubber. The ratio of any polymer blends can be selected according to need, for example based on the viscoelastic properties of the rubber compound. Those skilled in the art can readily determine which elastomers may be appropriate and their relative amounts to provide a desired viscoelastic property range.

In a preferred embodiment, the selected diene rubber for use in the invention will be SBR. This may be used alone or as a blend with any of the other rubbers mentioned herein. Binary and ternary blends are preferred. In one set of embodiments, SBR may be used in combination with butadiene rubber and/or natural rubber. When used in combination with butadiene rubber the amount of SBR in the blend may range from 50 to 90% by weight (based on the total weight of the blend), preferably from 60 to 80% by weight, e.g. about 70% by weight. A binary blend of SBR:butadiene rubber in which the components are present in a 70:30 weight ratio is particularly preferred. Ternary blends including SBR, butadiene and natural rubber can also be used in the invention. In such blends, the SBR will generally form the major component and will be present in an amount ranging from 40 to 80% by weight (based on the total weight of the blend), preferably from 50 to 70% by weight, e.g. about 60% by weight. The butadiene and natural rubber components may each be present in an amount ranging from 10 to 30% by weight (based on the total weight of the blend), e.g. about 20% by weight. An SBR:butadiene:natural rubber blend in which the components are present in a 60:20:20 weight ratio may, for example, be used.

Commercially available sources of synthetic rubber such as SBR include Arlanxeo, Germany. A non-limiting example of a styrene butadiene rubber for use in the invention is Buna VSL 3038-2 HM (Arlanxeo, Germany).

The modified silica can be blended with a diene rubber, and any other rubber materials as desired, to provide the rubber compounds according to the invention.

Methods for the preparation of the diene rubber-silica compounds herein described form a further aspect of the invention. In another aspect, the invention thus provides a process for producing a diene rubber-silica compound as herein described, said process comprising the step of dispersing a silica filler in a diene rubber matrix, wherein said silica filler is surface-modified by attachment of a $\pi$ system-containing moiety capable of forming a $\pi$-$\pi$ interaction with the diene rubber matrix.

Diene rubber-silica compounds in which the modified silica herein described is dispersed in a rubber matrix can be made using methods known in the art in the manufacture of rubber compounds, such as compounding with other components including silanes, processing aids, curing systems, anti-degradants, pigments, additional fillers, compatibilising agents for the fillers, fibres, resins, etc. Those skilled in the art can readily select a combination of vulcanizable rubber compounds for subsequent mixing and vulcanization according to the specific rubber product which is desired.

For example, in addition to the diene rubber matrix and chemically modified silica filler herein described, a vulcanizable composition may contain processing aids (e.g. oils), activators (e.g. zinc oxide, stearic acid, etc.), sulfur or sulfur-donating compounds, accelerators, anti-degradants (e.g. anti-oxidants, anti-ozonants, etc.), pigments, additional fillers, and compatibilising agents. Zinc oxide and stearic acid function as activators in the vulcanisation process by shortening the vulcanisation time and impact the length and number of cross-links in the rubber matrix that forms during curing or vulcanisation. Depending on the intended use of the sulfur-vulcanized material, these additives can be selected and used in the conventional amounts.

The amount of modified silica to be mixed into the rubber compound can be selected based on the desired physical properties of the resulting compound and may depend on the presence or absence of any other fillers, for example. Suitable amounts can readily be determined by those skilled in the art but may, for example, range from about 20 to about 150 phr, preferably from about 50 to about 100 phr, e.g. from about 60 to about 90 phr (where "phr" is parts per hundred parts of the rubber).

Additional reinforcing fillers such as carbon black, carbon nanotubes, short carbon, polyamide, polyester, natural fibres, calcium carbonate, clay, alumina, aluminosilicates, etc. or any mixtures of these may also be present. However, typically the only filler present in the compositions will be the chemically modified silica herein described.

Processing aids improve the processability of the compositions and include oils, such as mineral oils, vegetable oils, synthetic oils, or any mixtures thereof. These may be used in an amount of from about 5 to 75 phr, preferably from about 10 to 50 phr. Typical processing aids include oils, such as aromatic oils. Examples of such oils include Treated Distillate Aromatic Extract (TDAE), Residual Aromatic Extract (RAE), Mild Extract Solvate (MES), and bio-based oil seed derivatives.

Zinc oxide may be used in an amount of from about 1 to about 10 phr, preferably from about 2 to about 5 phr, more preferably from about 2 to about 3 phr. Stearic acid may be used in an amount of from about 1 to about 5 phr, preferably from about 2 to about 3 phr.

Sulfur may be used in an amount effective to achieve a satisfactory cure of the composition. It may, for example, range from about 1 to about 10 phr, preferably from about 1 to about 5 phr, e.g. from about 1 to about 3 phr.

Accelerators may be may be used in an amount of from about 1 to about 5 phr, preferably from about 1 to about 3 phr. Accelerators include thiazoles, dithiocarbamates, thiurams, guanidines, and sulphonamides. Examples of suitable accelerators include N-tertiary butyl benzothiazyle sulphonamide (TBBS), N-cyclohexyl-2-benzothiazole sulfenamide (CBS), diphenyl guanidine (DPG), 2-mercaptobenzothiazole (MBT) and tetrabenzilthiuram disulphide (TBZTD).

Compatibilising agents may be used to reduce the formation of silica aggregates during compounding and may be present in an amount of from about 0 to about 5 phr, preferably from about 1 to about 3 phr. In one embodiment, no additional compatibilising agents are present. Many compatibilizing agents are known for use in combining silica and rubber. The silica-based compatibilizing agents include silanes such as alkylalkoxy silanes, e.g. hexadecyltrimethoxy silane, octyltriethoxy silane and hexyltrimethoxy silane.

Coupling agents which function to covalently link the silica to the SBR matrix may be present, though for reasons herein described it is generally preferred that these are absent. If present, these should be provided in low amounts. The appropriate amount of any coupling agent can be determined by those skilled in the art having in mind factors such as its molecular weight, the number of functional groups it contains and its reactivity. Most coupling agents may be used in an isomolar amount based on the amount of silica. When using bis(triethoxysilylpropyl) tetrasulfide as a coupling agent, this may be provided in an amount of from about 0.6 to about 4.8 phr per 80 phr silica, preferably from 1.2 to 3.2 phr per 80 phr silica.

Examples of coupling agents include bifunctional silanes such as bis(3-triethoxysilylpropyl)tetrasulfide (TESPT), bis (3-triethoxysilylpropyl)disulfide (TESPD) and 3-octanoylthio-1-propyltriethoxysilane. In one embodiment, no additional coupling agents are present.

The rubber compounds may be prepared by methods known in the art and will involve mixing (i.e. compounding) of the rubber, the modified silica filler and any other components herein described to produce a rubber compound for subsequent vulcanization.

Mixing of the components will usually be carried out in stages in which the components may be added. Multi-step mixing processes are generally preferred to optimise dispersion of the silica filler and may involve the use of more than one mixer, for example different mixers arranged in series. For example, in the case of mixing a tire tread compound, the mixing process may involve an initial mixing stage in which a masterbatch is produced, followed by one or more additional non-productive mixing stages, and finally a productive mixing stage in which the curative agents (i.e. sulfur or sulfur-donating agents and accelerator(s)) are added. Mixers which may be used are well known in the art and include, for example, an open mill or a Banbury type mixer having tangential or intermeshing rotors.

Typically, the rubber, silica filler, processing aids, zinc oxide, stearic acid, anti-degradants (e.g. anti-oxidants, anti-ozonants), pigments, additional fillers, compatibilising agents, and coupling agents (where present) are mixed to produce the initial masterbatch. This initial masterbatch may be followed by another masterbatch in which additional fillers and additives are added, or by a non-productive mixing stage in which no additional components are added. Any non-productive mixing stage may be used to further disperse the components (e.g. fillers) within the rubber, or to decrease the viscosity of the mixed rubber compound.

During mixing, the temperature is kept below a predetermined level to avoid premature cross-linking of the composition. Typically, the temperature may be kept below 150° C., preferably below 140° C. In producing the initial masterbatch, mixing may for example be carried out a temperature of from about 80 to about 110° C., e.g. about 100° C. In the non-productive mixing stage the temperature may be raised, for example up to about 150° C., e.g. about 130° C. Where in-situ silanisation of the silica is performed during the mixing procedure, the use of temperatures at the higher end of this range may be necessary for the reaction to occur. Similarly, if any additional compatibilising agents are added during mixing, it may be necessary to carry out mixing at higher temperatures to ensure that these react with the silica surface. Mixing times may vary but can readily be determined by those skilled in the art based on the composition of the mixture and the type of mixer used. Generally a mixing time of at least 1 minute, preferably between 2 and 30 minutes, should be sufficient to obtain the desired homogenous composition.

A final mixing stage involves the addition of curatives, including accelerator(s), anti-degradants. The temperature for this mixing stage will generally be lower, for example in the range of from about 40 to about 60° C., e.g. about 50° C. This final mix may also be followed by a further non-productive mixing stage in which no additional components are added.

The most appropriate type of mixing can readily be selected to achieve a vulcanizable rubber compound. Mixing speeds may readily be determined, but may for example range from a speed of from about 20 to about 100 rpm, e.g. from about 30 to about 80 rpm, preferably about 50 rpm.

The vulcanizable rubber compound may be provided as an uncured (so-called "green") tire component for final vulcanisation that cures the composition. Curing to cross-link the rubber components may be carried out by known methods. In the tire industry, for example, an uncured rubber (so-called "green body") is produced followed by curing in a press mold which concurrently cross-links the rubber components and molds the components into a final tire. Vulcanisation cures the rubber by cross-linking, principally via sulfur cross-links. Vulcanisation methods are well known. Appropriate vulcanisation conditions typically include heating to a temperature in the range from 120 to 200° C. for a duration of from 5 to 180 mins.

The following scheme illustrates the formation of one type of π-π interaction between a general π system-containing moiety present on a surface-modified silica and SBR chains during compounding:

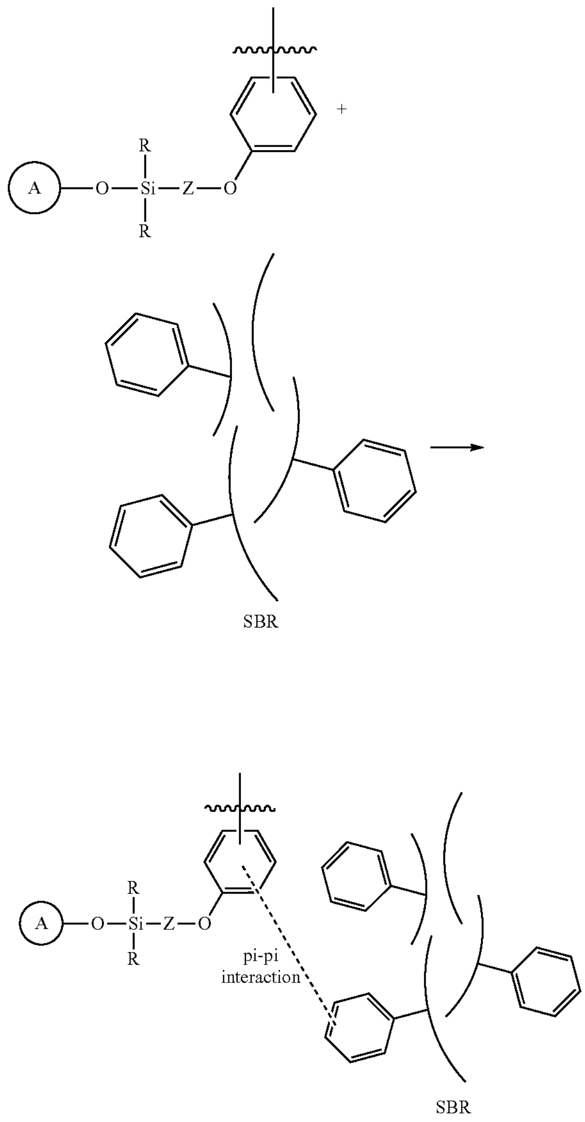

wherein A, Z, and R are as herein defined; and

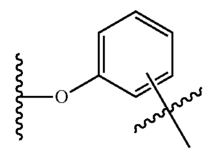

represents a residue of a π system-containing moiety, e.g. a phenolic resin.

Vulcanizable rubber compositions form a further aspect of the invention. In another aspect, the invention thus provides a vulcanizable rubber composition comprising a diene rubber matrix having dispersed therein a silica filler, wherein said silica filler is surface-modified by attachment of a π system-containing moiety which forms a π-π interaction with the diene rubber matrix.

Vulcanised rubber compounds obtained by, directly obtained by, or obtainable by cross-linking any vulcanizable rubber composition as herein described are also part of the invention.

Methods of producing a vulcanised rubber compound also form part of the invention. In another aspect, the invention thus provides a process for producing a vulcanized diene rubber-silica compound, said process comprising the steps of introducing a silica filler into a diene rubber matrix whereby to produce a vulcanizable rubber compound; and subjecting said vulcanizable rubber compound to vulcanization by heating to a predetermined temperature and for a predetermined time, wherein said silica filler is surface-modified by attachment of a π system-containing moiety capable of forming a π-π interaction with the diene rubber matrix.

The rubber compounds herein described find particular use in the manufacture of vehicle tires, in particular in the manufacture of tire components such as tire treads. Tire treads may be used for tires for any vehicle, but they find particular use in the manufacture of tire treads for motor cars. Other uses for the rubber compounds include as vibration dampers, sidewall rubbers, inner liner rubbers, bead filler rubbers, body ply rubbers, skim shock rubbers and tread rubbers.

In another aspect, the invention thus provides the use of a diene rubber-silica compound as herein described as a component of a vehicle tire or in the manufacture of a component of a vehicle tire.

In another aspect the invention provides a vehicle tire component, such as a tire tread, made from a diene rubber-silica compound as herein described. A vehicle tire comprising the vehicle tire component also forms part of the invention.

The assembly of the components of a tire and production methods are well known in the art. Assembly of the "green" tire is followed by compression molding in a suitable mold in which vulcanisation produces the final tire.

The rubber compounds according to the invention may also be used for non-tire applications, such as in the manufacture of hoses and seals.

In the present invention, the replacement of conventional fillers with the chemically modified silica filler results in a rubber compound having excellent physical properties, as well as acceptable wet traction and rolling resistance for use as tire tread rubber compounds. In the tire industry, various tests of the rubber compound are used as predictors of cured tire properties. These include the following:

The Payne Effect:

This provides an indication of the extent of the filler network and may be measured using a Rubber Process Analyzer.

Mechanical properties, such as tensile strength, elongation at break and reinforcement index:

ASTM D412 standard using universal testing machine Zwick Z05 (Zwick, Germany) operated with crosshead speed of 500 mm/min.

Percent rebound at 60° C. is a predictor of rolling resistance of the tread compound. An increased percent rebound at 60° C., when compared to a control compound, is indicative of lower rolling resistance. Rebound may be measured using a Zwick 5109 (Zwick, Germany) according to ISO 8307.

Hardness, Shore A may be measured using a universal hardness tester (Zwick, Germany) according to DIN 53505.

Dynamic Mechanical Properties:

These may be measured using a Gabo-Netzsch Eplexor at a frequency of 10 Hz, with a dynamic strain of 1% below 0° C. and 3% at room temperature. The loss factor (tangent δ, or tan δ) at 0° C. is an indicator of wet traction. An increase in tan δ at 0° C., when compared to a control compound, correlates with an improvement in wet traction of the tread compound. tan δ at 60° C. is an indicator of rolling resistance. A lower result, when compared to a control compound, is indicative of decreased rolling resistance.

The diene rubber-silica compounds herein described may be recycled using methods known in the art. Recycling involves devulcanisation of the rubber. During recycling the rubber compounds will usually be cut and shredded into finely divided form. The presence of the reversible π-π interaction between the modified silica filler and diene rubber chains permits the rubber compound to be further treated whereby to break the reversible bonds without the need for any harsh treatment conditions. For example, methods such as mild chemical, thermophysical or biological treatment may be used. Following the removal of impurities, the rubber may be combined with one or more additional polymer components and converted into a new polymer material.

In a further aspect, the invention thus provides a method of recycling a diene rubber-silica compound as herein described, said method comprising the step of de-vulcanising said compound; and optionally recovering the diene rubber.

The method of recycling may involve the step of shearing the compound whereby to form a finely divided rubber composition which can then be subjected to devulcanisation. Shearing of the diene rubber-silica compound may be achieved using any known method, such as grinding. Once ground into finely divided form, de-vulcanisation can be carried out in order to reclaim the rubber. Methods for de-vulcanisation include physical processes (e.g. mechanical, thermo-mechanical, microwave and ultrasonic) or chemical processes (e.g. the use of radical scavengers, nucleophilic additives, catalyst systems or chemical probes). Thermal de-vulcanisation may be carried out at a temperature of from 180 to 300° C. Thermo-chemical devulcanisation can be achieved by using a de-vulcanisation aid (e.g. a disulphide such as diphenylsulfide, dibutylsulfide or di(2-aminophenyl)disulfide) and the use of temperatures of from 180 to 300° C.

Once recovered, the diene rubber can be blended with original virgin diene rubber and/or other additional polymer components and used to produce a new polymer material.

The invention is illustrated further by way of the following non-limiting Examples and the accompanying figures, in which:

FIG. 1—Schematic representation of the reaction between silica, an epoxy-functional group and a phenolic resin in one embodiment of the invention.

Figure 2:
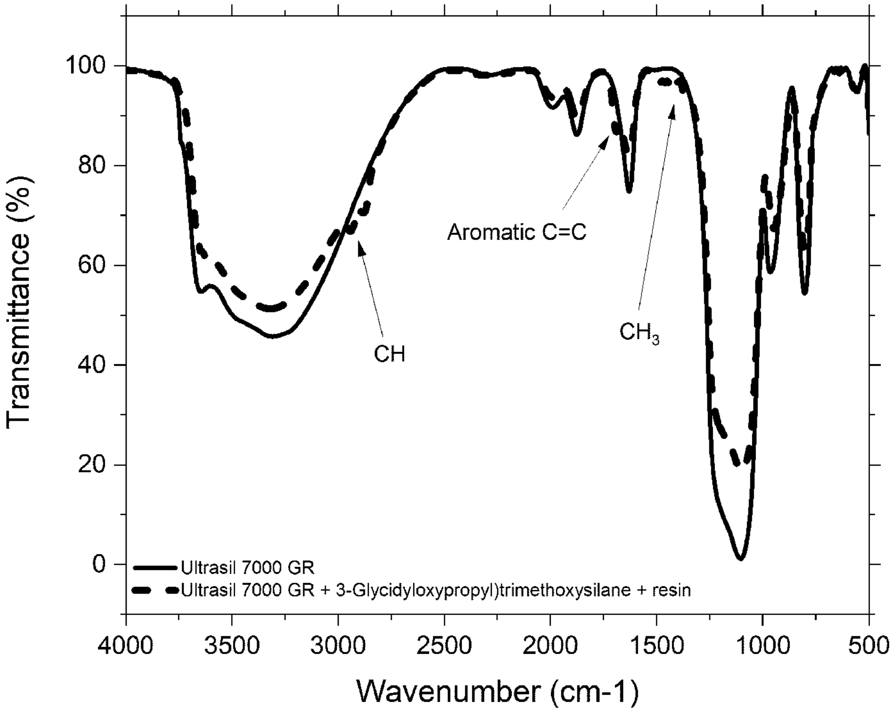

FIG. 2—FTIR analysis of unmodified and modified silica.

Figure 3:
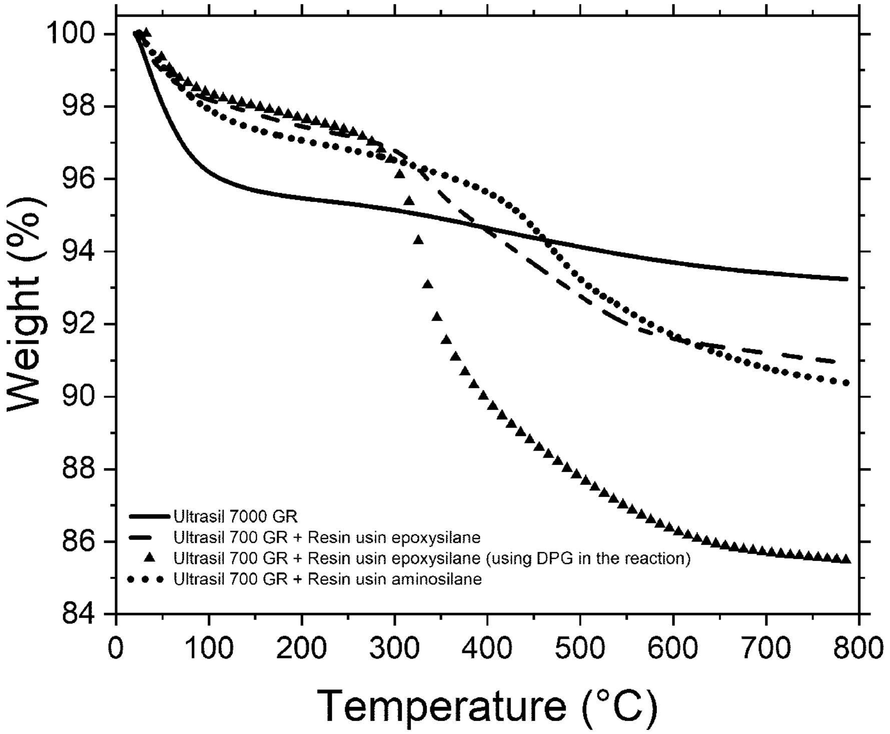

FIG. 3—TGA curves of unmodified and modified silica with 3-glycidyloxypropyl)trimethoxysilane, 3-glycidyloxypropyl)trimethoxysilane using DPG in the reaction, and 3-aminopropyltriethoxysilane.

Figure 4:
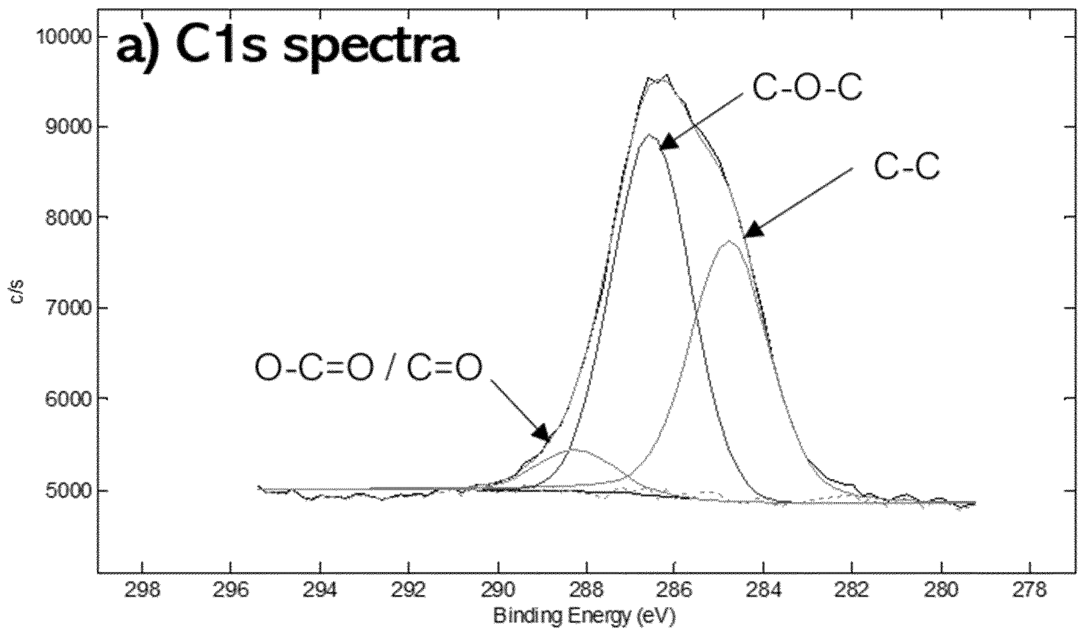
Figure 4:
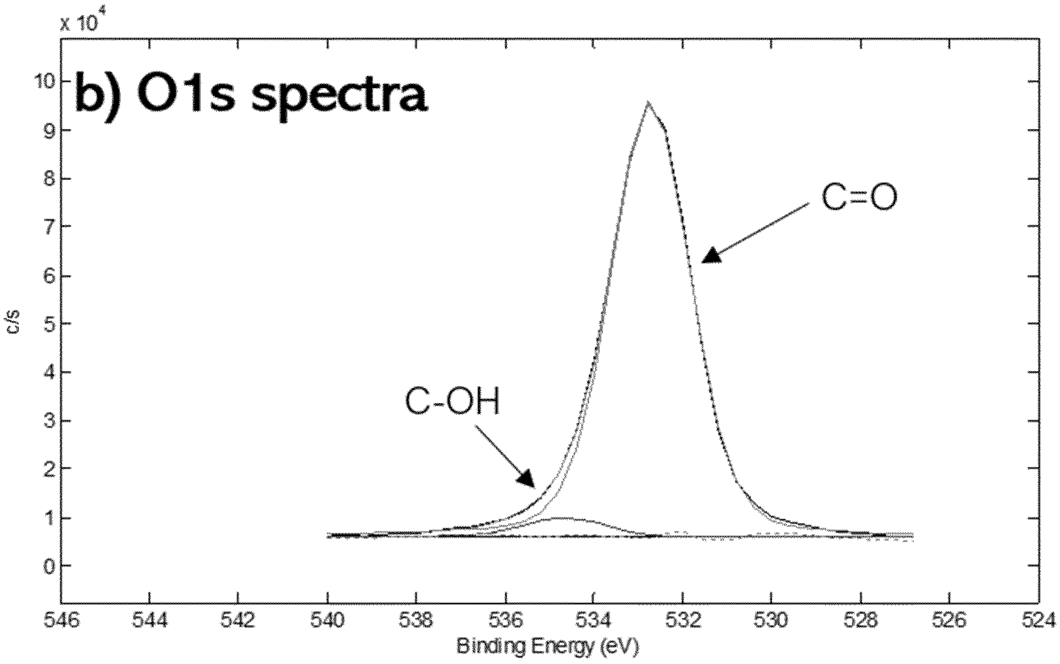

FIG. 4—XPS spectra of a) C1s and b) O1s of the modified silica.

Figure 5:
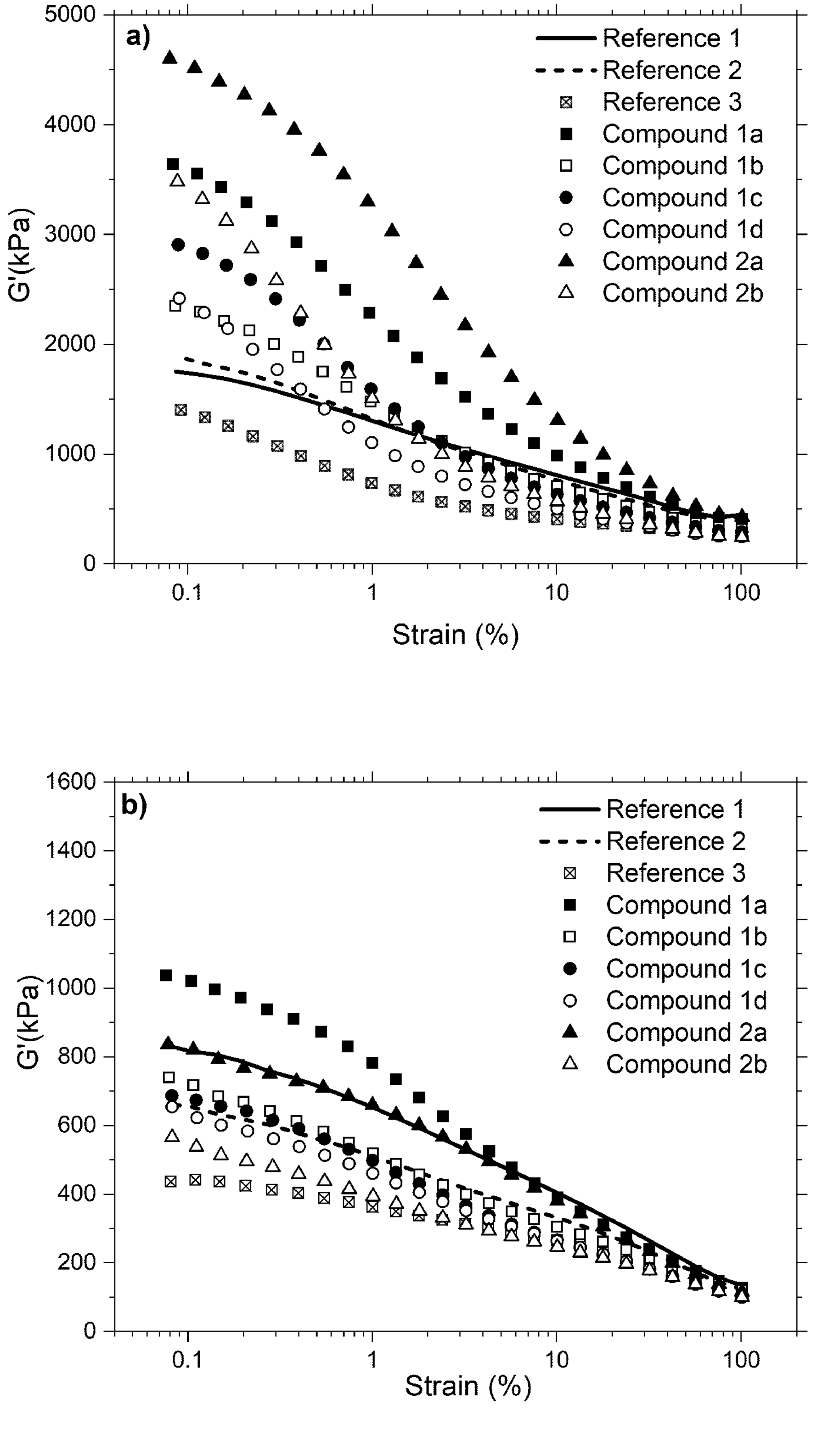

FIG. 5—a) Cured and b) Uncured Payne effect of the SSBR/silica compounds.

Figure 6:
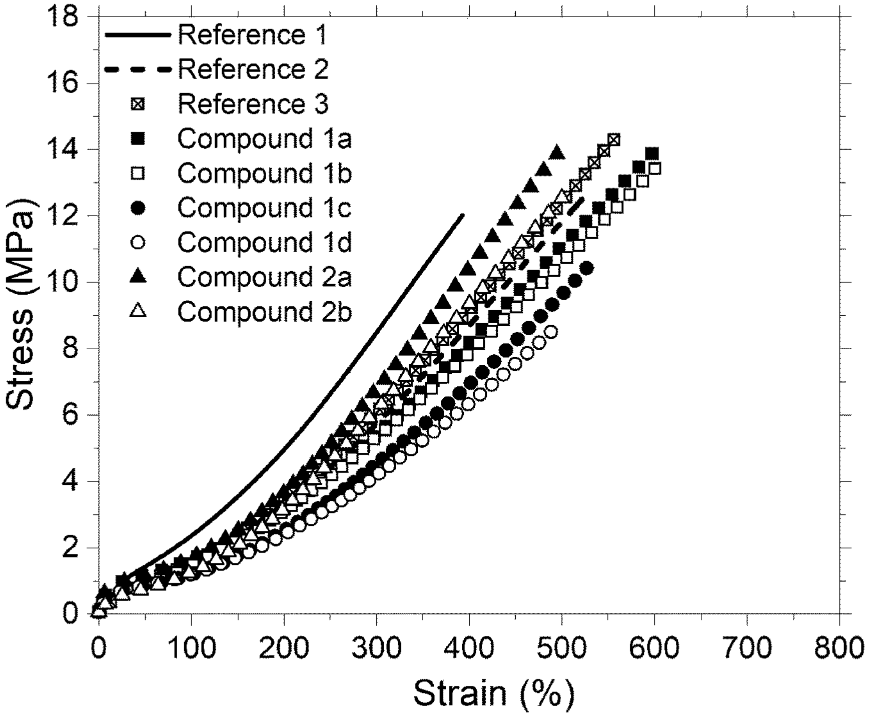
Figure 6:
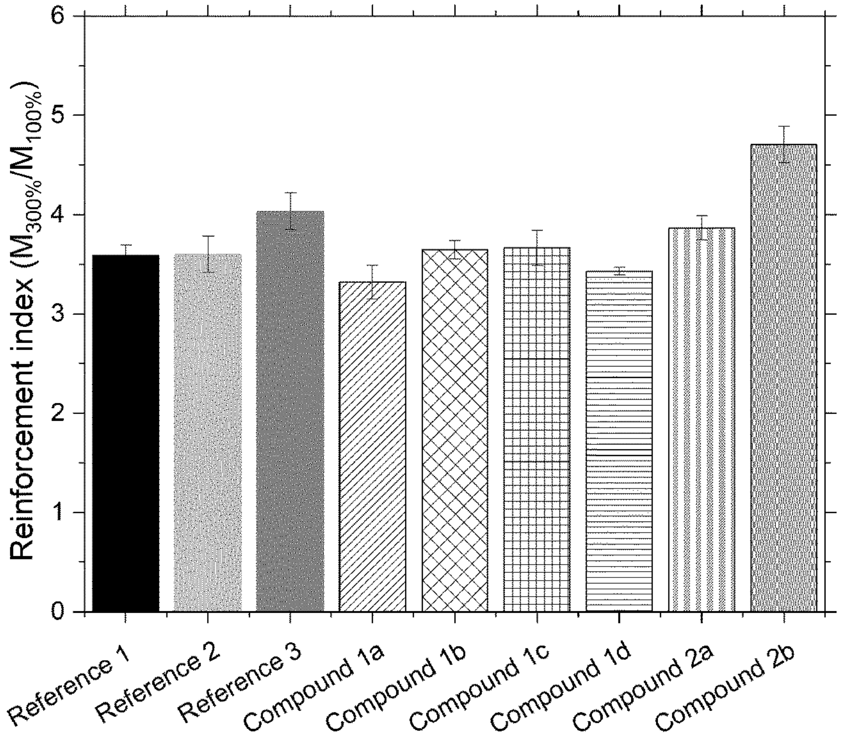

FIG. 6—a) Stress-strain curves and b) Reinforcement index of the SSBR/silica compounds.

Figure 7:
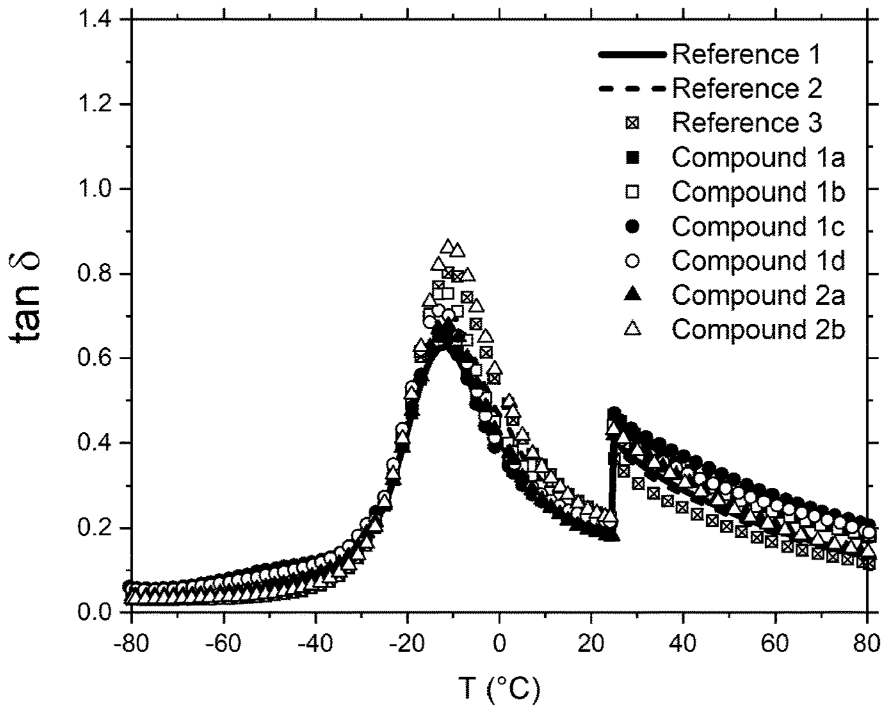
Figure 7:
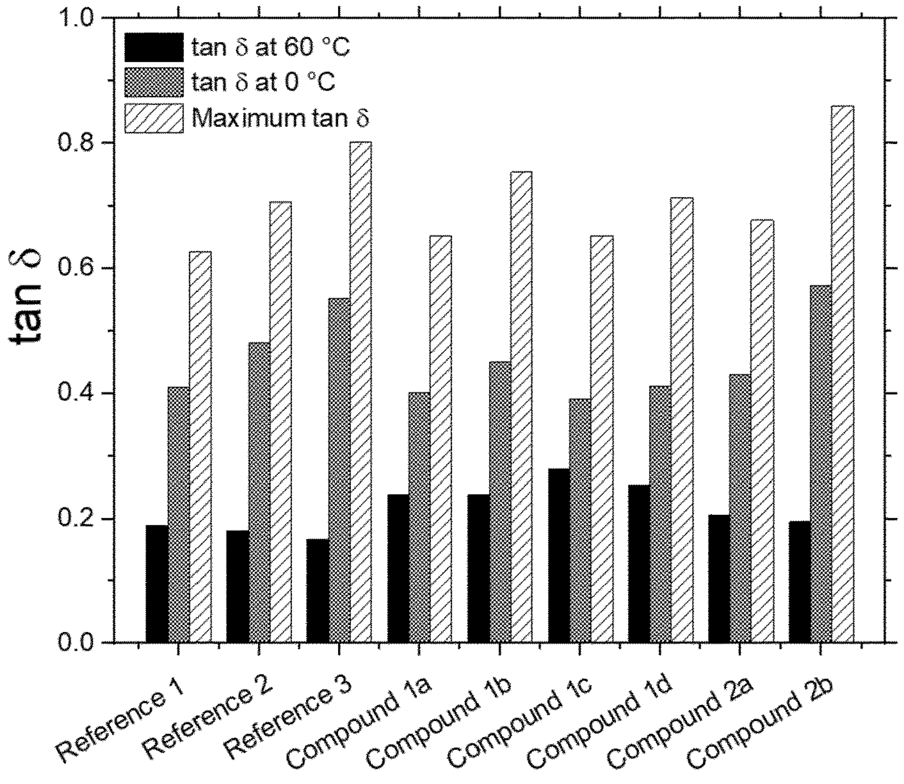

FIG. 7—a) Variation of the loss factor (tan δ) as a function of temperature and b) maximum tan δ and tan δ at 60° C. and 0° C. of the SSBR/silica compounds.

Figure 8:
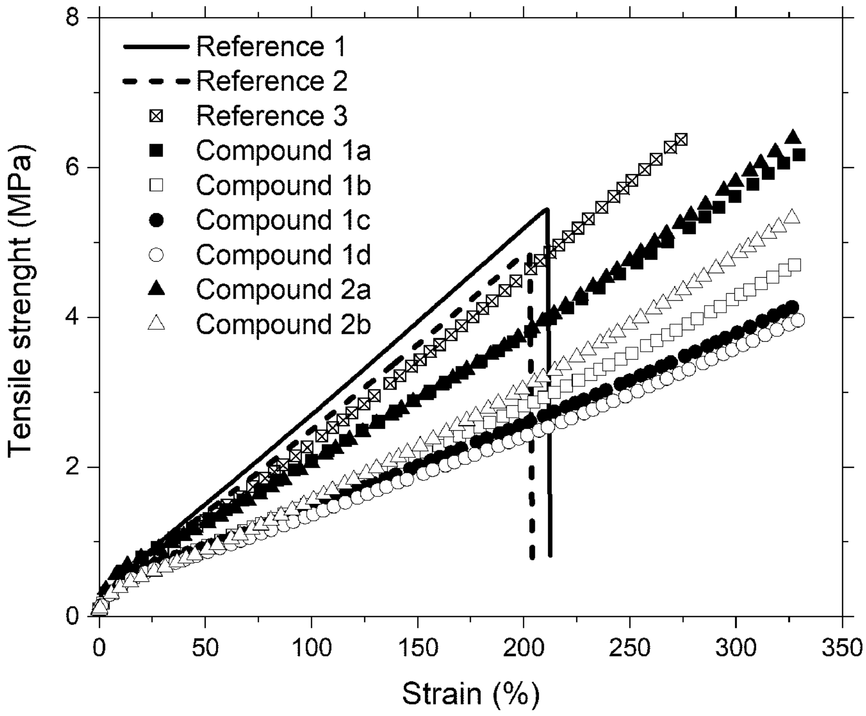

FIG. 8—Stress-strain curves at 100° C. for the SSBR/silica compounds.

EXAMPLES

Testing Procedures:

1. Payne Effect

Payne effect was measured using a Rubber Process Analyzer, RPA elite (TA instruments) with strain sweeps from 0.1% to 100% for cured samples and for uncured samples, at a frequency of 1.6 Hz and a temperature of 60° C. The cured samples were vulcanized beforehand inside the equipment chamber according to the vulcanization conditions at 160° C.

2. Modulus, Tensile Strength and Elongation at Break

Modulus, tensile strength (Stress at Maximum Strain) and elongation at break were measured using a universal testing machine Zwick Z05 (Zwick, Germany) operated with a crosshead speed of 500 mm/min according to ASTM D412. Modulus (100% (M100)) and 300% (M300)), tensile strength (Ts) and elongation at break (Eb) were calculated according to the calculations in ASTM D412. The reinforcement index was determined as the ratio of M300 to M100.

3. Rebound

Rebound, the resilience of a rubber sample based on the ratio of returned to delivered energy, was measured according to ISO 8307 using a testing machine Zwick 5109 (Zwick, Germany). Percentage rebound was calculated according to ISO 8307.

4. Hardness, Shore A

Shore A hardness was measured according to DIN 53505 using a universal hardness tester (Zwick, Germany).

5. Loss and Storage Modulus, and Loss Factor (tan δ)

Dynamic mechanical measurement of the vulcanized samples was carried out using a Gabo-Netzsch Eplexor. Measurements were performed with a frequency of 10 Hz, a dynamic strain of 1% below 0° C. and 3% at room temperature (RT). The change in the strain at RT was investigated due to softening of the rubber at higher temperatures which can generate noise in the measurements.

6. Mechanical Properties at High Temperature

Mechanical properties of the compounds at 100° C. were measured by a universal testing machine Zwick Z010 (Zwick, Germany) operated with a crosshead speed of 500 mm/min and with a limit strain of 330%. The tests were performed in a temperature chamber at 100° C. Measurements of the dynamic properties of the vulcanized compounds before and after cycling the samples in the tensile machine were carried out on a Gabo-Netzsch Eplexor. Measurements were performed with a frequency of 10 Hz, a dynamic strain of 1% below 0° C. and 3% at room temperature (RT). The change in the strain at RT was investigated due to softening of the rubber at higher temperatures which can generate noise in the measurements. The cycling of the samples was performed in a universal testing machine Zwick Z010 (Zwick, Germany) operated with a crosshead speed of 500 mm/min and with a limit strain of 200%. All samples were cycled 5 times at 100° C.

Preparation of Rubber Compounds:

Rubber compounds for tire tread applications were prepared using a non-functionalised solution styrene butadiene rubber (SSBR) as the polymer matrix and pre-modified silica as the filler.

Materials:

- Rubber: Non-functionalised SSBR: Buna VSL 3038-2 HM (Arlanxeo, Germany)
- Silica: ULTRASIL® 7000 GR (Evonik Resource Efficiency GmbH, Germany)
- (3-Glycidyloxypropyl)trimethoxysilane (Sigma Aldrich, the Netherlands)
- (3-aminopropyltriethoxysilane) (Sigma Aldrich, the Netherlands).
- DUREZ 19900 (Sumitomo Bakelite Europe, Belgium)
- TDAE (Hansen & Rosenthal, Germany)
- Zinc oxide (Millipore Sigma, Germany)
- Stearic Acid (Millipore Sigma, Germany)
- Sulfur (Caldic B.V., the Netherlands)
- N-Tertiary butyl benzothiazyl sulphonamide (TBBS) (Caldic B.V., the Netherlands)
- Hexadecyltrimethoxysilane (Sigma Aldrich, the Netherlands)
- Bis(3-triethoxysilylpropyl)disulfide (TESPD): Si266® (Evonik Resource Efficiency GmbH, Germany).

Silica Modification:

Chemical modification of the silica (ULTRASIL® 7000 GR) was performed by reaction with a silane and an alkyl phenol-formaldehyde resin (DUREZ 19900). Silanes employed for the modification were an epoxy silane, i.e. (3-glycidyloxypropyl)trimethoxysilane, and an amino silane, i.e. (3-aminopropyltriethoxysilane). FIG. 1 is a schematic of the reaction in which the silane is (3-glycidyloxypropyl)trimethoxysilane.

Step 1: Reaction Between Silica and Silane:

Silica (ULTRASIL® 7000 GR) and the silane were reacted. The amount of silane was 10% of the mass of the silica employed for the modification process. The reaction was performed for 24 hours at 55° C. using toluene as the solvent.

Step 2: Grafting of the Phenolic Resin to the Silica Surface:

The alkyl phenol-formaldehyde resin was grafted to the silica surface. The reaction between the pre-modified silica and the phenolic resin was performed for 24 hours at 55° C. using toluene as the solvent. In the case of the reaction with 3-(glycidyloxypropyl)trimethoxysilane, the reaction was modified to obtain a higher yield: DPG was added as a catalyst to promote the epoxy ring opening. The amount of silane added was 15% for every 100 g of silica.

The resulting modified silica was analysed by Fourier Transform Infrared Spectroscopy (FTIR) using the DRIFTS (diffuse reflectance infrared Fourier transform spectrometry) cell. Chemical modification of the silica was confirmed for all samples by the presence of three peaks located at ~2985 $cm^{-1}$, ~2750 $cm^{-1}$ and ~1440 $cm^{-1}$ (corresponding to —CH, aromatic C═C and —$CH_3$, respectively) (see FIG. 2).

The yield of the reactions was measured by Thermogravimetric Analysis (TGA) using a TA 550 device from TA Instruments operating under a nitrogen and air atmosphere with a heating rate of 20° C./min from room temperature to 800° C. The obtained yields were 1.6% for the reaction with 3-(glycidyloxypropyl)trimethoxysilane and 2% for the reaction with 3-aminopropyltriethoxysilane. In the case of the reaction with 3-(glycidyloxypropyl)trimethoxysilane in which DPG was used as a catalyst, the obtained yield was 8%. TGA curves of the unmodified and modified silica produced in the different reaction are shown in FIG. 3.

X-ray photoelectron spectroscopy (XPS) was performed using a Quantera SXM (scanning XPS microprobe) from Physical Electronics. The data analysis was made using the software Compass for XPS control, Multipak v.9.8.0.19 for data reduction. The XPS analysis showed the presence of carbon atoms in the sample, indicating that the silane had reacted with the silica. In the C1s spectra the presence of C—O—C structures was observed evidencing that the epoxy rings survived the modification. Hydrolysation can form C—O—H but this was observed in a very low amount (see FIG. 4).

Preparation of Rubber Compounds According to the Invention:

Rubber compounds (SBR/modified silica) in accordance with the invention were prepared in an internal mixer (Brabender Plasticorder 350S, Duisburg, Germany) with a fill factor of 0.7, initial temperature of 100° C. and rotor speed of 50 rpm. Samples were prepared according to the formulation in Error! Reference source not found. Table 1 and in accordance with the mixing procedure in Table 2. Each rubber compound was prepared in two different versions, i.e. with and without the addition of a compatibilising agent (hexadecyltrimethoxysilane). The addition of the compatibilising agent during the mixing process decreases the filler-filler interaction during compounding.

TABLE 1

Formulation of rubber compounds in accordance with the invention

| Ingredients | Quantity (phr = per hundred parts rubber) |
|---|---|
| SSBR - Buna VSL 3038-2 HM | 100 |
| Modified silica - ULTRASIL ® 7000 GR + modifier | 80 + amount of modifier calculated by TGA |
| TDAE | 37.5 |
| ZnO | 2.5 |
| Stearic Acid | 2.5 |
| Sulfur | 1.4 |
| TBBS | 2 |
| Hexadecyltrimethoxysilane, | 2 |

TABLE 2

Mixing procedure of the rubber compounds

| Time [min:s] | Action |
|---|---|
| | Step 1 pre-heating 100° C. - 50 rpm |
| 0.00 | Add rubber, mastication |
| 1.20 | Add ⅓ filler, ½ silane (compatibilising agent) |
| 2.40 | Add ⅓ filler, ½ silane (compatibilising agent), TDAE |
| 4.00 | Add ⅓ filler, zinc oxide, stearic acid |
| 5.00 | Increase torque (increase temperature to 130° C.) |
| 10.00 | Stop mixing (reaching 140° C.) |

TABLE 2-continued

| Mixing procedure of the rubber compounds | |
|---|---|
| Time [min:s] | Action |
| | Step 2 pre-heating 50° C. - 50 rpm |
| 0.00 | Add elastomer pre-mix, mastication |
| 1.30 | Add all curatives (sulphur, TBBS) |
| 3.00 | Stop mixing |

Details of the final rubber compounds according to the invention are set out in Table 3 below.

TABLE 3

| SSBR/modified silica compounds | |
|---|---|
| Compound 1a | Silica modified with 3-(glycidyloxypropyl)trimethoxysilane + phenolic resin |
| Compound 1b | Silica modified with 3-(glycidyloxypropyl)trimethoxysilane + phenolic resin and the addition of hexadecyltrimethoxysilane during mixing |
| Compound 1c | Silica modified with 3-(glycidyloxypropyl)trimethoxysilane + phenolic resin and DPG in the reaction |
| Compound 1d | Silica modified with 3-(glycidyloxypropyl)trimethoxysilane + phenolic resin and DPG in the reaction and the addition of hexadecyltrimethoxysilane during mixing |
| Compound 2a | Silica modified with 3-aminopropyltriethoxysilane + phenolic resin |
| Compound 2b | Silica modified with 3-aminopropyltriethoxysilane + phenolic resin and the addition of hexadecyltrimethoxysilane during mixing |

Preparation of Reference Rubber Compounds:

The results obtained from the SSBR/modified silica rubber compounds were compared to three reference rubber compounds, details of which are shown in Table 4.

TABLE 4

| Reference SSBR/silica compounds | |
|---|---|
| Reference 1 | SSBR/silica compound in-situ silanized with TESPD |
| Reference 2 | SSBR/pre-modified silica with TESPD |
| Reference 3 | SSBR/pre-modified silica with TESPD plus addition of the compatibilising agent during the mixing process |

The reference compounds were prepared according to the formulation shown in Table 5 and in accordance with the mixing procedure used for the compounds according to the invention shown in Table 2 (in which the silane is "TESPD or the compatibilising agent", as appropriate).

TABLE 5

| Formulation of reference compounds | |
|---|---|
| Ingredients | Quantity (phr) |
| SSBR - Buna VSL 3038-2 HM | 100 |
| Silica - ULTRASIL ® 7000 GR | 80/80 + Si266 ®* calculated by TGA |
| Si266 ®* | 6.2 |
| TDAE | 37.5 |
| ZnO | 2.5 |

TABLE 5-continued

| Formulation of reference compounds | |
|---|---|
| Ingredients | Quantity (phr) |
| Stearic Acid | 2.5 |
| Sulfur | 1.4 |
| TBBS | 2 |
| Hexadecyltrimethoxysilane | 2 |

*Bis(3-triethoxysilylpropyl)disulfide (TESPD)

Testing of Rubber Compounds:

Results for the measured Payne effect are shown in Table 6 and FIG. 5.

TABLE 6

Payne effect of the SSBR/silica compounds

| | Vulcanised - Payne effect | | Unvulcanised - Payne effect | |
|---|---|---|---|---|
| Compound | ΔG', kPa | $G'_{100\%}$, kPa | ΔG', kPa | $G'_{100\%}$, kPa |
| Reference 1 | 1301.9 | 450.3 | 700.6 | 134.2 |
| Reference 2 | 1462.3 | 429.9 | 541.5 | 122.9 |
| Reference 3 | 1117.4 | 286.6 | 331.6 | 104.4 |
| Compound 1a | 3229.1 | 409.3 | 911.0 | 125.9 |
| Compound 1b | 2034.4 | 317.9 | 620.8 | 119.1 |
| Compound 1c | 2615.4 | 291.8 | 586.3 | 99.8 |
| Compound 1d | 2171.5 | 245.9 | 555.5 | 98.9 |
| Compound 2a | 4173.0 | 428.0 | 720.7 | 115.6 |
| Compound 2b | 3237.1 | 243.4 | 465.2 | 100.0 |

The results show that the compounds 1 d and 2b according to the invention show a lower unvulcanised Payne effect than the reference compounds 1 and 2, and a slightly superior unvulcanised Payne effect to reference compound 3. For the vulcanised Payne effect all the compounds according to the invention present higher values than the reference compounds.

Results for the mechanical properties of the vulcanised compounds are shown in Table 7 and FIG. 6.

TABLE 7

Mechanical properties of the SSBR/silica compounds

| Compound | Ts (MPa) | Eb (%) | M100 (MPa) | M300 (MPa) | Reinforcement index (M300/M100) |
|---|---|---|---|---|---|
| Reference 1 | 11.4 | 385 | 2.24 | 8.04 | 3.59 |
| Reference 2 | 12.7 | 524 | 1.62 | 5.83 | 3.60 |
| Reference 3 | 13.4 | 531 | 1.52 | 6.14 | 4.04 |
| Compound 1a | 13.8 | 615 | 1.59 | 5.32 | 3.35 |
| Compound 1b | 13.0 | 585 | 1.46 | 5.34 | 3.66 |
| Compound 1c | 10.0 | 534 | 1.20 | 4.42 | 3.67 |
| Compound 1d | 9.1 | 511 | 1.25 | 4.28 | 3.43 |
| Compound 2a | 13.2 | 494 | 1.69 | 6.55 | 3.87 |
| Compound 2b | 10.8 | 469 | 1.22 | 5.75 | 4.71 |

The mechanical properties show that all compounds according to the invention have similar values of reinforcement as the reference compounds, and in the case of compound 2b is superior to all the reference compounds. The tensile strength of the compounds according to the invention are similar to the reference compounds except for compounds 1c, 1d and 2b that are slightly lower. The compounds according to the invention show similar values for elongation at break to the reference compounds. The values for all compounds according to the invention are considered acceptable with respect to the reference compounds.

The rebound properties of the compounds and hardness are shown in Table 8. The rebound results show that all compounds according to the invention present lower values than the reference compounds. The compounds according to the invention show similar hardness values to the reference compounds. Compound 1a presents the highest value for hardness of all samples.

TABLE 8

Rebound and hardness of the SSBR/silica compounds

| Compound | Rebound at 60° C. % | Hardness, Shore A |
|---|---|---|
| Reference 1 | 39.8 | 52.4 |
| Reference 2 | 40.1 | 58.8 |
| Reference 3 | 43.0 | 53.9 |
| Compound 1a | 30.2 | 63.7 |
| Compound 1b | 34.8 | 50.1 |
| Compound 1c | 30.9 | 58.3 |
| Compound 1d | 36.5 | 57.6 |
| Compound 2a | 32.1 | 58.3 |
| Compound 2b | 36.4 | 53.2 |

Results of the dynamic mechanical measurement of the vulcanized samples are set out in Table 9 and FIG. 7.

TABLE 9

Maximum tan δ and tan δ at 60° C. and 0° C. of the SSBR/silica compounds

| Compound | tan δ at 60° C. | tan δ at 0° C. | tan δ maximum |
|---|---|---|---|
| Reference 1 | 0.189 | 0.409 | 0.627 |
| Reference 2 | 0.180 | 0.482 | 0.707 |
| Reference 3 | 0.167 | 0.553 | 0.802 |
| Compound 1a | 0.237 | 0.401 | 0.652 |
| Compound 1b | 0.237 | 0.451 | 0.753 |
| Compound 1c | 0.278 | 0.391 | 0.652 |
| Compound 1d | 0.253 | 0.412 | 0.713 |
| Compound 2a | 0.205 | 0.431 | 0.677 |
| Compound 2b | 0.195 | 0.574 | 0.859 |

Analysis of the loss factor (tan δ) as a function of the temperature shows that the compounds according to the invention present higher values of tan δ at 60° C. (indicating higher rolling resistance) and similar values of tan δ at 0° C. and maximum of tan δ (indicating similar wet grip) compared to the reference compounds. The values for all compounds according to the invention are considered acceptable with respect to the reference compounds.

The re-connectivity of the new bonds created with the silica modification according to the invention was analysed by studying the mechanical response of the compounds at high temperatures and analysing the change in dynamic properties after submitting the compounds to a cycling (fatigue test). The results are set out in FIG. 8 and Table 10.

TABLE 10

Mechanical properties of the SSBR/silica compounds at 100° C.

| Compound | Ts[1] (MPa) | M100 (MPa) | M300 (MPa) |
|---|---|---|---|
| Reference 1 | 5.3 | 2.7 | — |
| Reference 2 | 5.7 | 2.7 | — |
| Reference 3 | 5.9 | 2.3 | — |
| Compound 1a | 5.7 | 1.9 | 5.2 |
| Compound 1b | 4.7 | 1.5 | 4.3 |
| Compound 1c | 6.2 | 2.1 | 5.8 |
| Compound 1d | 5.1 | 1.5 | 4.7 |
| Compound 2a | 4.2 | 1.4 | 3.8 |
| Compound 2b | 3.9 | 1.4 | 3.6 |

[1]Ts values are for the reference compounds only. For the compounds according to the invention the results are for the Stress at 330% (maximum extension in the heating chamber).

The results of the mechanical properties measured at 100° C. show that the compounds according to the invention present better resistance to high temperature. All the reference samples were broken before reaching the limit strain established for the experiment (330% strain). However, in the case of the compounds according to the invention, the samples did not break during the experiment indicating that the new bonds created with the silica modification are able to re-connect and consequently resist the tests at high temperatures. Regarding the modulus at 100% the compounds according to the invention show a lower modulus compared to the reference samples.

Results of the dynamic mechanical measurement of the vulcanised compounds before and after cycling in the tensile machine are set out in Table 11.

TABLE 11

Maximum tan δ and tan δ at 60° C. and 0° C. of the SSBR/silica compounds

| Compound | tan δ at 60° C. | tan δ at 60° C. after cycling 5 times at 100° C. | tan δ at 0° C. | tan δ at 0° C. after cycling 5 times at 100° C. | tan δ maximum | tan δ maximum after cycling 5 times at 100° C. |
|---|---|---|---|---|---|---|
| Reference 3 | 0.167 | 0.211 | 0.553 | 0.724 | 0.802 | 0.907 |
| Compound 2b | 0.194 | 0.225 | 0.573 | 0.687 | 0.859 | 0.944 |

Compound 2b showed smaller changes in its dynamic properties after being submitted to 5 cycles at 100° C. until 200% strain than the reference compound 3.

The invention has been described with reference to exemplary embodiments. Modifications and alterations are considered to form part of the invention to the extent that they are within the scope of the disclosure and appended claims. The scope of the disclosure should be determined with reference to the claims and is considered to include equivalents.

The invention claimed is:

1. A diene rubber-silica compound comprising:

a diene rubber matrix having dispersed therein a silica filler, the silica filler having a a π system-containing moiety attached to the surface of the silica filler, the x system-containing moiety having π-π interaction with the diene rubber matrix.

2. The diene rubber-silica compound of claim 1, wherein the diene rubber comprises styrene-butadiene rubber, or a blend of styrene-butadiene rubber with a butadiene rubber.

3. The diene rubber-silica compound of claim 1, wherein the π-π interaction is formed between the π system-containing moiety and a carbon-carbon double bond and/or phenyl ring present in the diene rubber matrix.

4. The diene rubber-silica compound of claim 1, wherein there is a substantial absence of any covalent interactions between the silica filler and the diene rubber matrix.

5. The diene rubber-silica compound of claim 1, wherein the π system-containing moiety is a compound containing π systems chosen from an aromatic or heteroaromatic ring, a tropylium cation, an allyl group, or an acrolein group, and combinations thereof.

6. The diene rubber-silica compound of claim 5, wherein the π system-containing moiety comprises a polyphenyl compound or a synthetic resin containing one or more aromatic rings.

7. The diene rubber-silica compound of claim 6, wherein said synthetic resin comprises a phenolic resin, an aromatic hydrocarbon resin, a hydrogenated aromatic hydrocarbon resin, an aliphatic/aromatic hydrocarbon resin, a hydrogenated aliphatic/aromatic hydrocarbon resin, a cycloaliphatic/aromatic hydrocarbon resin, a hydrogenated cycloaliphatic/aromatic hydrocarbon resin, a polyterpene resin, a terpene-phenol resin, a coumarone-indene resin, or a grafted version of any of such resins or any mixture thereof.

8. The diene rubber-silica compound of claim 1, wherein said π system-containing moiety is attached to the silica filler via a linking group which forms a bond to the silica filler and a bond to the π system-containing moiety.

9. The diene rubber-silica compound of claim 8, wherein the linking group is represented by:

(I)

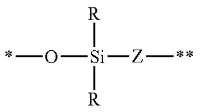

or (II)

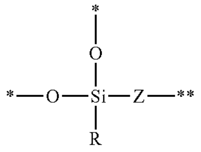

in which

* denotes a point of attachment of the linking group to a surface of the silica filler;

** denotes the point of attachment of the linking group to the π system-containing moiety;

each R is independently selected from —OH, $C_{1-6}$ alkoxy and $C_{1-6}$ alkyl; and Z is a $C_{1-12}$ alkylene group which may be interrupted by one or more groups selected from —O—, —SiR'$_2$— (in which each R' is independently —OH, $C_{1-6}$ alkoxy, or $C_{1-6}$ alkyl), —PR"—, —NR"—, and —OP(O)(OR")O— (in which R" is H or $C_{1-6}$ alkyl).

10. The diene rubber-silica compound of claim 8, wherein the linking group is represented by:

(I)

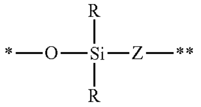

or

-continued (II)

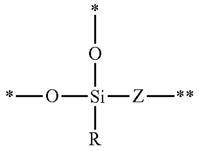

in which

* denotes a point of attachment of the linking group to a surface of the silica filler;

** denotes the point of attachment of the linking group to the π system-containing moiety;

each R is independently selected from —OH, $C_{1-3}$ alkoxy and $C_{1-3}$ alkyl; and Z is a $C_{1-12}$ alkylene group which may be interrupted by one or more groups selected from —O—, —SiR'$_2$— (in which each R' is independently —OH, $C_{1-6}$ alkoxy or $C_{1-6}$ alkyl), —PR"—, —NR"—, and —OP(O)(OR")O— (in which R" is H or $C_{1-3}$ alkyl).

11. The diene rubber-silica compound of claim 9, wherein the linking group is represented by:

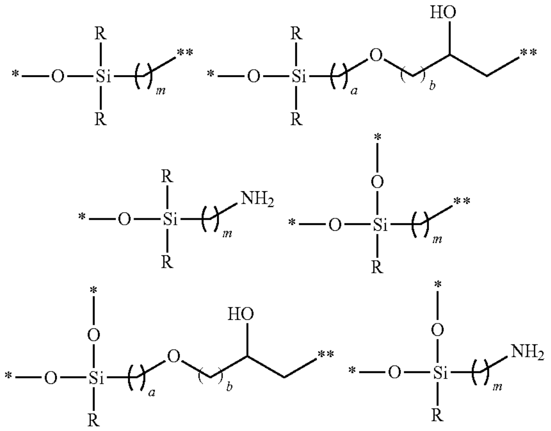

in which

* denotes a point of attachment of the linking group to a surface of the silica filler;

** denotes the point of attachment of the linking group to the π system-containing moiety;

m is an integer from 0 to 12;

a is an integer from 0 to 6; and b is an integer from 0 to 6.

12. The diene rubber-silica compound of claim 1 further comprising a vulcanizable diene rubber-silica compound.

13. A vulcanized rubber compound formed by cross-linking a diene rubber-silica compound as claimed in claim 12.

14. A vehicle tire, comprising a vehicle tire component made from the diene rubber-silica compound of claim 1.

15. A diene rubber-silica compound comprising:

a diene rubber matrix having dispersed therein a silica filler;

a π system-containing moiety attached to the surface of the silica filler and having π-π interaction with the diene rubber matrix, wherein the π system-containing moiety is a compound containing π systems chosen from an aromatic or heteroaromatic ring, a tropylium cation, an allyl group, or an acrolein group, and combinations thereof.

16. A diene rubber-silica compound comprising:

a diene rubber matrix having dispersed therein a silica filler;

a π system-containing moiety attached to the surface of the silica filler and having π-π interaction with the diene rubber matrix, wherein the π system-containing moiety is attached to the silica filler via a linking group which forms a bond to the silica filler and a bond to the x system-containing moiety, wherein the linking group is represented by:

(I)

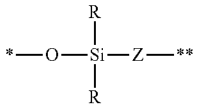

or

-continued (II)

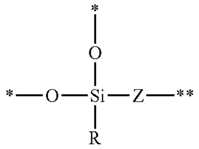

in which

* denotes a point of attachment of the linking group to a surface of the silica filler;

** denotes the point of attachment of the linking group to the π system-containing moiety;

each R is independently selected from —OH, $C_{1-6}$ alkoxy and $C_{1-6}$ alkyl; and Z is a $C_{1-12}$ alkylene group which may be interrupted by one or more groups selected from —O—, —$SiR'_2$— (in which each R' is independently —OH, $C_{1-6}$ alkoxy, or $C_{1-6}$ alkyl), —PR"—, —NR"—, and —OP(O)(OR")O— (in which R" is H or $C_{1-6}$ alkyl).

* * * * *